United States Patent
Jiang et al.

(10) Patent No.: US 12,422,637 B2
(45) Date of Patent: Sep. 23, 2025

(54) OPTICAL FIBER DISTRIBUTION DEVICE, AND OPTICAL FIBER SCHEDULING METHOD AND SYSTEM

(71) Applicant: Huawei Technologies Co., Ltd., Shenzhen (CN)

(72) Inventors: Yongshuo Jiang, Wuhan (CN); Yida Wen, Shenzhen (CN); Fanshi Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 18/176,724

(22) Filed: Mar. 1, 2023

(65) Prior Publication Data

US 2023/0204891 A1    Jun. 29, 2023

Related U.S. Application Data

(63) Continuation of application No. PCT/CN2021/111899, filed on Aug. 10, 2021.

(30) Foreign Application Priority Data

Sep. 2, 2020    (CN) .......................... 202010912294.0

(51) Int. Cl.
G02B 6/44    (2006.01)
(52) U.S. Cl.
CPC ......... *G02B 6/4452* (2013.01); *G02B 6/4471* (2013.01)
(58) Field of Classification Search
CPC .......................... G02B 6/4452; G02B 6/4471
See application file for complete search history.

(56) References Cited

U.S. PATENT DOCUMENTS

| | | | |
|---|---|---|---|
| 5,784,515 A * | 7/1998 | Tamaru | H04Q 1/147 |
| | | | 385/139 |
| 6,256,443 B1 | 7/2001 | Uruno et al. | |
| 8,488,938 B2 | 7/2013 | Kewitsch et al. | |
| 9,052,465 B2 | 6/2015 | Kewitsch | |
| 2013/0209048 A1 | 8/2013 | Vleugels | |

(Continued)

FOREIGN PATENT DOCUMENTS

| CN | 1607407 A | 4/2005 |
|---|---|---|
| CN | 201845117 U | 5/2011 |

(Continued)

*Primary Examiner* — Sung H Pak
(74) *Attorney, Agent, or Firm* — Conley Rose, P.C.

(57) ABSTRACT

An optical fiber distribution device includes a distribution portion, a connector retracting portion, and a robot system. The distribution portion comprises an optical fiber adapter, wherein the optical fiber adapter is configured to connect to a first optical fiber connector connected to a first optical fiber. The connector retracting portion is configured to accommodate the first optical fiber connector and the first optical fiber connected to the first optical fiber connector. The robot system is configured to remove a target optical fiber connector from an initial optical fiber adapter, retract the target optical fiber connector and a second optical fiber connected to the target optical fiber connector to the connector retracting portion, and remove the target optical fiber connector from the connector retracting portion and insert the target optical fiber connector into a target optical fiber adapter.

20 Claims, 23 Drawing Sheets

(56) References Cited

U.S. PATENT DOCUMENTS

2016/0202424 A1    7/2016   Kewitsch et al.
2019/0056553 A1    2/2019   Kewitsch

FOREIGN PATENT DOCUMENTS

| | | |
|---|---|---|
| CN | 103180767 A | 6/2013 |
| CN | 204758895 U | 11/2015 |
| CN | 207336882 U | 5/2018 |
| CN | 109613671 A | 4/2019 |
| CN | 210427901 U | 4/2020 |
| CN | 111399136 A | 7/2020 |
| CN | 112099163 A | 12/2020 |
| DE | 4243383 A1 | 6/1994 |
| EP | 0724367 A1 | 7/1996 |
| JP | H06181584 A | 6/1994 |
| JP | H07104201 A | 4/1995 |
| JP | H07318821 A | 12/1995 |
| JP | H08262349 A | 10/1996 |
| JP | H09159840 A | 6/1997 |
| JP | 2004093922 A | 3/2004 |
| JP | 2018502537 A | 1/2018 |
| TW | 201905518 A | 2/2019 |
| WO | 2006054279 A1 | 5/2006 |

\* cited by examiner

OPTICAL FIBER DISTRIBUTION DEVICE, AND OPTICAL FIBER SCHEDULING METHOD AND SYSTEM

CROSS-REFERENCE TO RELATED APPLICATIONS

This application is a continuation of International Patent Application No. PCT/CN2021/111899, filed on Aug. 10, 2021, which claims priority to Chinese Patent Application No. 202010912294.0, filed on Sep. 2, 2020. The disclosures of the aforementioned applications are hereby incorporated by reference in their entireties.

TECHNICAL FIELD

The present disclosure relates to the field of communication technologies, and in particular, to an optical fiber distribution device, and an optical fiber scheduling method and system.

BACKGROUND

With the popularization of fiber to the x (FTTX), optical fiber resources are more intensively applied. In scenarios such as a data center, an upstream optical distribution frame (ODF) of an optical distribution network (ODN), and a street cabinet, there are a large quantity of optical fiber scheduling and port-level optical cross-connection requirements. As a result, fiber scheduling operations performed by personnel of an optical fiber network operator are increasingly heavy.

Therefore, it is necessary to study an optical fiber distribution device that can perform automatic fiber scheduling.

SUMMARY

Embodiments of the present disclosure provide an optical fiber distribution device, and an optical fiber scheduling method and system. The optical fiber distribution device can implement automatic optical fiber scheduling. The technical solutions of the optical fiber distribution device, and the optical fiber scheduling method and system are described as follows.

An embodiment of the present disclosure provides an optical fiber distribution device, including a distribution portion, a connector retracting portion, and a robot system, where the distribution portion is provided with an optical fiber adapter, and the optical fiber adapter is configured to connect to an optical fiber connector connected to an optical fiber; the connector retracting portion is configured to accommodate the optical fiber connector and the optical fiber connected to the optical fiber connector; and the robot system is configured to remove the target optical fiber connector from an initial optical fiber adapter; retract the target optical fiber connector and an optical fiber connected to the target optical fiber connector to the connector retracting portion; and take out the target optical fiber connector from the connector retracting portion and insert the target optical fiber connector into a target optical fiber adapter.

The distribution portion is provided with the optical fiber adapter configured to connect to the optical fiber connector, so that the optical fiber adapter is connected to the optical fiber connector at the distribution portion.

The connector retracting portion is configured to accommodate the optical fiber connector and the optical fiber connected to the optical fiber connector. The connector retracting portion may be divided into three areas, which are respectively a connector parking area, an active fiber accommodating area, and a fiber storage area in a direction of the optical fiber, and the connector parking area is close to the optical fiber connector.

The robot system is a main operation component of the optical fiber distribution device, and can implement actions of inserting and removing the optical fiber connector into and from the optical fiber adapter, a retracting action of accommodating the optical fiber connector and the optical fiber to the connector retracting portion, an action of taking out the optical fiber connector from the connector retracting portion, and the like.

In addition, the optical fiber distribution device may further include a controller, so that the controller can control the robot system and various driving mechanisms, to complete automatic optical fiber scheduling. To ensure accuracy of actions of the robot system and various driving mechanisms, the optical fiber distribution device may further include various sensors, so that the controller can implement closed-loop control based on data fed back by the sensors.

According to the optical fiber distribution device provided in this embodiment of the present disclosure, when a target optical fiber connector is scheduled from an initial optical fiber adapter to a target optical fiber adapter, the target optical fiber connector is first removed from the initial optical fiber adapter, and then the target optical fiber connector and an optical fiber are retracted to the connector retracting portion. In a retracting process, the target optical fiber connector and the optical fiber are retracted from a wound optical fiber cluster (if there is an optical fiber cluster), to avoid winding between the optical fiber connected to the target optical fiber connector and other optical fibers. Then, the target optical fiber connector is taken out of the connector retracting portion, and finally is inserted into the target optical fiber adapter indicated by a scheduling instruction.

It can be learned that, in an optical fiber scheduling process, the optical fiber distribution device provided in this embodiment of the present disclosure retracts an optical fiber connector and an optical fiber to the connector retracting portion, and winding between the optical fiber connected to the target optical fiber connector and other optical fibers is avoided in the retracting process, so that an insertion and removal robot does not need to travel in a complex route to bypass all optical fibers that may be wound, thereby greatly reducing time for optical fiber scheduling.

In a possible implementation, the connector retracting portion includes a plurality of connector accommodating holes, the plurality of connector accommodating holes one-to-one correspond to a plurality of optical fiber connectors, the target optical fiber connector corresponds to a target connector accommodating hole, and the optical fiber connected to the target optical fiber connector passes through the target connector accommodating hole. When the target optical fiber connector and the optical fiber connected to the target optical fiber connector are retracted to the connector retracting portion, the robot system is configured to retract a target optical fiber passing through the target connector accommodating hole to the connector retracting portion, and retract an optical fiber connector to which the target optical fiber is connected to the target connector accommodating hole. When the target optical fiber connector is taken out of the connector retracting portion, the robot system is configured to take out the optical fiber connector from the target connector accommodating hole.

An optical fiber connected to each optical fiber connector passes through one connector accommodating hole.

In the solution shown in this embodiment of the present disclosure, the plurality of connector accommodating holes one-to-one correspond to the plurality of optical fiber connectors, so that each optical fiber connector (or each optical fiber) has a determined location that is different from each other, the optical fiber distribution device records a location of each optical fiber connector, and prevents optical fibers connected to the plurality of optical fiber connectors from being wound.

A location of the target optical fiber connector in the connector retracting portion may be determined by using a location of the target connector accommodating hole (the target connector accommodating hole corresponds to the target optical fiber connector).

When the target optical fiber connector is retracted to the connector retracting portion, the robot system retracts an optical fiber connector to which an optical fiber passing through the target connector accommodating hole is connected to the target connector accommodating hole, and retracts the optical fiber to the connector retracting portion. When the target optical fiber connector is taken out of the connector retracting portion, the robot system takes out the optical fiber connector from the target connector accommodating hole. That is, the optical fiber distribution device determines an identity of an optical fiber connector by using a connector accommodating hole.

A location of the optical fiber connector in the distribution portion may be determined by using a location of the optical fiber adapter into which the optical fiber connector is inserted.

In a possible implementation, the robot system includes an insertion and removal robot, a first fiber accommodating mechanism, and a clamp jaw robot. The insertion and removal robot is located on the distribution portion, and is configured to insert and remove the optical fiber connector into and from the optical fiber adapter. The first fiber accommodating mechanism is located on the connector retracting portion, and is configured to retract the optical fiber connector and the optical fiber connected to the optical fiber connector to the connector retracting portion. The clamp jaw robot is located on the connector retracting portion, and is configured to take out the optical fiber connector from the connector retracting portion, and transfer the taken-out optical fiber connector to the insertion and removal robot.

In a possible implementation, the connector retracting portion includes a connector parking area, an active fiber accommodating area, and a fiber storage area. The connector parking area, the active fiber accommodating area, and the fiber storage area are sequentially arranged in a direction of the optical fiber, and the connector parking area is close to the optical fiber connector. The clamp jaw robot is located in the connector parking area, the first fiber accommodating mechanism is located in the active fiber accommodating area, and the fiber storage area is used to accommodate the optical fiber connected to the optical fiber connector.

The connector parking area, the active fiber accommodating area, and the fiber storage area may be sequentially arranged from top to bottom. The connector parking area may be perpendicular to a distribution panel of the distribution portion.

In the solution shown in this embodiment of the present disclosure, the connector parking area is used to park the optical fiber connector, and the connector accommodating hole may be located in the connector parking area. The active fiber accommodating area is provided with a mechanism for accommodating an optical fiber. The mechanism can accommodate the optical fiber connector in the connector parking area and accommodate the optical fiber in the fiber storage area. The fiber storage area is used to accommodate an optical fiber, and may be provided with a plurality of fiber storage cavities that are spaced apart from each other, to avoid winding of the optical fibers in the fiber storage area.

In a possible implementation, the robot system further includes a transit robot. The transit robot is adjacent to both the distribution portion and the connector parking area, and is configured to transfer the optical fiber connector carried by the clamp jaw robot to the insertion and removal robot.

The transit robot may be located in the connector parking area, or may be located on the distribution portion.

In the solution shown in this embodiment of the present disclosure, an action of transferring an optical fiber by the clamp jaw robot to the insertion and removal robot may be implemented by using the transit robot. The clamp jaw robot first transfers the optical fiber connector to the transit robot, and then the transit robot transfers the optical fiber connector to the insertion and removal robot.

In a possible implementation, the first fiber accommodating mechanism includes two fiber accommodating units, and the two fiber accommodating units are arranged opposite to each other. The fiber accommodating units each include a rotating shaft and a fiber accommodating wheel, an axis direction of the rotating shaft is parallel to an arrangement direction of the connector accommodating holes, the fiber accommodating wheel is in key connection to the rotating shaft, and the fiber accommodating wheel is movable in an axial direction of the rotating shaft. The fiber accommodating wheel is provided with protrusion portions in a circumferential direction, and locations of the protrusion portions of the fiber accommodating wheel of one fiber accommodating unit correspond to locations of the protrusion portions of the fiber accommodating wheel of the other fiber accommodating unit. In a fiber accommodating state of the first fiber accommodating mechanism, the two protrusion portions clamp the optical fiber connected to the optical fiber connector, and accommodate, through rotation, the optical fiber connected to the optical fiber connector.

In the solution shown in this embodiment of the present disclosure, when the first fiber accommodating mechanism is in the fiber accommodating state, the two fiber accommodating wheels clamp the optical fiber, and accommodate, through rotation, the optical fiber in the fiber storage area. In addition, the optical fiber connector is dragged by using the optical fiber, and the optical fiber connector is accommodated in the connector accommodating hole. However, in a non-fiber accommodating state, non-protrusion portions of the two fiber accommodating wheels are opposite to each other, the two fiber accommodating wheels have a large distance and do not clamp the optical fiber, and the two fiber accommodating wheels may move in an axial direction. In this way, the two fiber accommodating wheels can accommodate at least one column of optical fibers.

In a possible implementation, the transit robot includes a transit robot base, an overturning driving apparatus, and an overturning plate. The overturning driving apparatus is fixed on the transit robot base, and the overturning driving apparatus is in transmission connection to the overturning plate. A surface of the overturning plate close to the connector retracting portion is provided with a connector carrying hole, and the connector carrying hole is fitted with the optical fiber connector.

In the solution shown in this embodiment of the present disclosure, the transit robot can transfer the optical fiber connector through overturning of the overturning plate. When being in a horizontal state, the overturning plate can receive the optical fiber connector inserted by the clamp jaw robot. When the overturning plate is in a vertical state, the insertion and removal robot can clamp the optical fiber connector from the overturning plate.

In a possible implementation, the connector parking area includes a transit robot track and a transit robot synchronous belt assembly. An axis direction of the transit robot track is perpendicular to an arrangement direction of connector accommodating holes, the transit robot track is located on one side of the connector parking area, and the transit robot synchronous belt assembly is located inside the transit robot track. The transit robot base matches the transit robot track, and is fixedly connected to the transit robot synchronous belt assembly.

In the solution shown in this embodiment of the present disclosure, the transit robot can move along the transit robot track, and power for the transit robot to move is provided by the transit robot synchronous belt assembly. The transit robot moves, so that the transit robot can be responsible for transiting more optical fiber connectors.

In a possible implementation, the clamp jaw robot includes a clamp jaw robot base, a transverse movable base, a clamping mechanism, a clamp jaw pair, and a clamp jaw rotation driving apparatus. The transverse movable base is slidably connected to the clamp jaw robot base, and a sliding direction is perpendicular to an arrangement direction of connector accommodating holes. The clamp jaw rotation driving apparatus is fixed on the transverse movable base, and the clamp jaw pair is sleeved on a rotating shaft of the clamp jaw rotation driving apparatus. The clamping mechanism is located on the transverse movable base and is configured to tighten or loosen the clamp jaw pair.

In the solution shown in this embodiment of the present disclosure, the clamp jaw pair can implement a clamping action, a loosening action, and a removal action on the optical fiber connector. The clamping mechanism can implement clamping and loosening actions of the clamp jaw pair on the optical fiber connector by clamping or loosening the clamp jaw pair. The clamp jaw rotation driving apparatus can drive the clamp jaw pair to rotate to implement the removal action on the optical fiber connector. After the clamp jaw pair clamps the optical fiber connector, the clamp jaw rotation driving apparatus can remove the optical fiber connector from the connector accommodating hole by driving the clamp jaw pair to rotate. The clamping mechanism, the clamp jaw pair, and the clamp jaw rotation driving apparatus may be fixed on the transverse movable base, the transverse movable base is slidably connected to the clamp jaw robot base, and a sliding direction is perpendicular to the arrangement direction of the connector accommodating holes. In this way, the clamp jaw pair can move closer to the optical fiber connector or away from the optical fiber connector.

In a possible implementation, the clamping mechanism includes a clamping driving apparatus, a driving connecting rod, and two clamping arms. Middle parts of the two clamping arms are hinged and a hinged point is fixed, the clamping arms are provided with connection protrusions, two ends of the driving connecting rod are provided with connection holes, the connection protrusions of the two clamping arms are respectively located in the connection holes at the two ends of the driving connecting rod, and the connection protrusions are slidable in the connection holes. Each clamping end of the two clamping arms clamps one clamp jaw of the clamp jaw pair. A push rod of the clamping driving apparatus is fixedly connected to the driving connecting rod, and the push rod is perpendicular to the driving connecting rod.

In the solution shown in this embodiment of the present disclosure, when the clamping mechanism performs clamping, the push rod of the clamping driving apparatus extends outward and drives the driving connecting rod to move, so that the two clamping arms move toward each other under pushing of the driving connecting rod, and the two clamping arms drive the clamp jaw pair to implement a clamping action.

When the clamping mechanism performs loosening, the push rod of the clamping driving apparatus retracts inward and drives the driving connecting rod to move, so that the two clamping arms move away from each other under driving of the driving connecting rod, and the two clamping arms drive the clamp jaw pair to implement a loosening action.

In a possible implementation, the connector parking area is provided with a clamp jaw robot guide rail and a clamp jaw robot synchronous belt assembly. An axis direction of the clamp jaw robot guide rail and a movement direction of the clamp jaw robot synchronous belt assembly are parallel to an arrangement direction of connector accommodating holes. The clamp jaw robot base of the clamp jaw robot matches the clamp jaw robot guide rail, and is fixedly connected to the clamp jaw robot synchronous belt assembly.

In the solution shown in this embodiment of the present disclosure, the clamp jaw robot can move along the clamp jaw robot guide rail, and power for the clamp jaw robot to move is provided by the clamp jaw robot synchronous belt assembly.

In a possible implementation, the clamp jaw robot further includes a clamping plate. The clamping plate corresponds to a location of the clamp jaw pair in a vertical direction, and the clamping plate is fixedly connected to the clamp jaw robot base. The clamping plate clamps the fiber accommodating wheel in the first fiber accommodating mechanism.

In the solution shown in this embodiment of the present disclosure, the fiber accommodating wheel can move along the rotating shaft through driving of the clamping plate. The clamping plate is fixed on the clamp jaw robot base, so that when moving, the clamp jaw robot drives the fiber accommodating wheel to move through the clamping plate.

The clamping plate corresponds to the location of the clamp jaw pair in the vertical direction. Therefore, after the clamp jaw robot drives the fiber accommodating wheel to move to a target location and completes fiber accommodating, the clamp jaw robot does not need to move, and can clamp the optical fiber connector by using the clamp jaw pair.

In a possible implementation, the insertion and removal robot includes an insertion and removal robot base, an insertion and removal base, two clamping bases, and two clamping arms. The insertion and removal base is slidably connected to the insertion and removal robot base in a first direction, and the first direction is perpendicular to the distribution portion. The two clamping bases are located on the insertion and removal base, and are slidably connected to the insertion and removal base in a second direction, movement directions of the two clamping bases are opposite, and the second direction is parallel to an axis direction of the clamp jaw robot guide rail. The two clamping arms are respectively located on the two clamping bases, the clamping arms are slidably connected to the clamping bases in a third direction, and the third direction is perpendicular to both the first direction and the second direction.

In the solution shown in this embodiment of the present disclosure, the insertion and removal base is slidably connected to the insertion and removal robot base in the first direction, and both the two clamping arms are located on the insertion and removal base. Therefore, the insertion and removal base can drive the two clamping arms to move bidirectionally in the first direction, to implement an insertion action and a removal action on the optical fiber connector.

The two clamping bases are slidably connected to the insertion and removal base in the second direction, and the movement directions of the two clamping bases are opposite. In addition, the two clamping arms are respectively located on the two clamping bases. Therefore, the clamping bases can drive the two clamping arms to move away from each other or closer to each other in the second direction, to implement a clamping action and a loosening action on the optical fiber connector.

The two clamping arms are slidably connected to the clamping bases in the third direction. Therefore, the two clamping arms can extend out and retract relative to the clamping bases, to implement an action of avoiding the optical fiber adapter by the insertion and removal robot.

In a possible implementation, the distribution portion includes an insertion and removal robot track and an insertion and removal robot synchronous belt assembly, and the insertion and removal robot synchronous belt assembly is located inside the insertion and removal robot track. The insertion and removal robot track is located on one side of at least one column of optical fiber adapters. The insertion and removal robot matches the insertion and removal robot track and is engaged with the insertion and removal robot synchronous belt assembly.

In the solution shown in this embodiment of the present disclosure, the insertion and removal robot can move along the insertion and removal robot track to near different optical fiber adapters, to insert and remove more optical fiber connectors. The insertion and removal robot track provides a traveling track for the insertion and removal robot, and the insertion and removal robot synchronous belt assembly provides traveling power for the insertion and removal robot.

In a possible implementation, there are a plurality of columns of insertion and removal robot tracks, and the robot system further includes a column change robot. The column change robot is located on the distribution portion, and is configured to transfer the insertion and removal robot to different insertion and removal robot tracks.

In the solution shown in this embodiment of the present disclosure, by disposing the column change robot, the insertion and removal robot can be transferred to different insertion and removal robot tracks, so that one insertion and removal robot can insert and remove optical fiber connectors near the plurality of columns of insertion and removal robot tracks.

In a possible implementation, the column change robot includes a column change robot base, a column change track, and a column change synchronous belt assembly, the column change track is fixed on the column change robot base, and the column change synchronous belt assembly is located inside the column change track. The distribution portion further includes a lead screw mechanism, an axis direction of the lead screw mechanism is parallel to an arrangement direction of the plurality of columns of insertion and removal robot tracks, and the column change robot base matches the lead screw mechanism. In a column change state of the insertion and removal robot, the insertion and removal robot matches the column change track and is engaged with the column change synchronous belt assembly.

In the solution shown in this embodiment of the present disclosure, the insertion and removal robot can be driven by the column change synchronous belt assembly and the insertion and removal robot synchronous belt assembly together to the column change robot. In addition, the insertion and removal robot can be limited to the column change robot through transverse limiting of the column change track and longitudinal limiting of the column change synchronous belt assembly.

The column change robot can be moved to different insertion and removal robot tracks through the lead screw mechanism, so that the column change track can be easily connected to different insertion and removal robot tracks. Then, the insertion and removal robot can be driven by the column change synchronous belt assembly and the insertion and removal robot synchronous belt assembly together again to the insertion and removal robot track.

In a possible implementation, the robot system includes a distribution robot and a second fiber accommodating mechanism. The distribution robot is located between the distribution portion and the connector retracting portion, and is configured to insert and remove the optical fiber connector into and from the optical fiber adapter, and take out the optical fiber connector from the connector retracting portion. The second fiber accommodating mechanism is located on the connector retracting portion, and is configured to retract the optical fiber connector and the optical fiber connected to the optical fiber connector to the connector retracting portion.

In the solution shown in this embodiment of the present disclosure, the distribution robot can implement all functions of the insertion and removal robot, the clamp jaw robot, the transit robot, and the column change robot.

The second fiber accommodating mechanism may be the same as the first fiber accommodating mechanism, that is, the second fiber accommodating mechanism includes two fiber accommodating units, and the two fiber accommodating units are arranged opposite to each other. The fiber accommodating units each include a rotating shaft and a fiber accommodating wheel, an axis direction of the rotating shaft is parallel to an arrangement direction of the connector accommodating holes, the fiber accommodating wheel is in key connection to the rotating shaft, and the fiber accommodating wheel is movable in an axial direction of the rotating shaft. The fiber accommodating wheel is provided with protrusion portions in a circumferential direction, and locations of the protrusion portions of the fiber accommodating wheel of one fiber accommodating unit correspond to locations of the protrusion portions of the fiber accommodating wheel of the other fiber accommodating unit. In a fiber accommodating state of the first fiber accommodating mechanism, the two protrusion portions clamp the optical fiber connected to the optical fiber connector, and accommodate, through rotation, the optical fiber connected to the optical fiber connector.

In a possible implementation, the connector retracting portion includes a connector parking area, an active fiber accommodating area, and a fiber storage area. The connector parking area, the active fiber accommodating area, and the fiber storage area are sequentially arranged in a direction of the optical fiber, and the connector parking area is close to the optical fiber connector. The second fiber accommodating mechanism is located in the active fiber accommodating area.

In the solution shown in this embodiment of the present disclosure, the connector parking area is used to park the optical fiber connector, and the connector accommodating hole may be located in the connector parking area. The active fiber accommodating area is provided with a mechanism for accommodating an optical fiber. The mechanism can accommodate the optical fiber connector in the connector parking area and accommodate the optical fiber in the fiber storage area. The fiber storage area is used to accommodate an optical fiber, and may be provided with a plurality of fiber storage cavities that are spaced apart from each other, to avoid winding of the optical fibers in the fiber storage area.

In a possible implementation, the distribution robot includes a first guide rail, a second guide rail, a third guide rail, and a clamping mechanism. The first guide rail is fixed at the bottom of the optical fiber distribution device, the second guide rail is slidably connected to the first guide rail, the third guide rail is fixed on the second guide rail, and axis directions of the first guide rail, the second guide rail, and the third guide rail are perpendicular to each other. The clamping mechanism is slidably connected to the third guide rail, and is configured to clamp and loosen the optical fiber connector.

In the solution shown in this embodiment of the present disclosure, by disposing the first guide rail, the second guide rail, and the third guide rail that are perpendicular to each other, the clamping mechanism can move to each point in space. Therefore, actions such as inserting and removing the optical fiber connector by the distribution robot in the distribution portion, removing the optical fiber connector from the connector parking area, carrying the optical fiber connector from the connector parking area to the distribution portion, and avoiding the optical fiber can be implemented.

In a possible implementation, the clamping mechanism includes a first clamping arm, a second clamping arm, and a clamping driving apparatus. The first clamping arm is slidably connected to the second clamping arm. The clamping driving apparatus is in transmission connection to the first clamping arm, and is configured to drive a clamping end of the first clamping arm to move away from or closer to a clamping end of the second clamping arm.

In the solution shown in this embodiment of the present disclosure, the clamping driving apparatus drives the clamping end of the first clamping arm to move away from or closer to the clamping end of the second clamping arm, so that the first clamping arm and the second clamping arm can clamp or loosen the optical fiber connector.

In a possible implementation, the fiber storage area includes a gravity ring, and the gravity ring is hung on the optical fiber connected to the optical fiber connector.

In the solution shown in this embodiment of the present disclosure, by disposing the gravity ring, a pulling force can be applied to the optical fiber, so that the optical fiber is in a semi-tensioned state, and the optical fiber is not easily hung by the optical fiber cluster, thereby ensuring operability of retracting the optical fiber. In addition, the optical fiber is not wound and knotted due to an excessive extra length of the optical fiber.

In addition, the optical fiber is in the semi-tensioned state rather than a completely stretched state. Therefore, the optical fiber may be a common optical fiber instead of a customized tension-resistant optical fiber, which reduces manufacturing costs of the optical fiber.

In a possible implementation, the optical fiber connector is provided with a guide structure in an axial direction, and an outer diameter of the optical fiber connector is one to five times an outer diameter of the optical fiber connected to the optical fiber connector.

The guide structure may be one or more of a rounded structure and a chamfered structure.

In the solution shown in this embodiment of the present disclosure, the optical fiber connector is provided with the guide structure in the axial direction and has a small outer diameter, so that the optical fiber connector is easy to be retracted from the wound optical fiber cluster and is not easily hung by the optical fiber cluster, thereby improving a success rate of accommodating the optical fiber.

According to a second aspect, an optical fiber scheduling method is provided, where the method is applied to the foregoing optical fiber distribution device, and the method includes: controlling the robot system to remove a target optical fiber connector from an initial optical fiber adapter; retracting the target optical fiber connector and an optical fiber connected to the target optical fiber connector to the connector retracting portion; and taking out the target optical fiber connector from the connector retracting portion, and inserting the target optical fiber connector into a target optical fiber adapter.

In a possible implementation, before the controlling the robot system to remove a target optical fiber connector from an initial optical fiber adapter, the method further includes: obtaining a location corresponding to the initial optical fiber adapter; before the retracting the target optical fiber connector and an optical fiber connected to the target optical fiber connector to the connector retracting portion, the method further includes: obtaining a location corresponding to a target connector accommodating hole corresponding to the target optical fiber connector; and before the inserting the target optical fiber connector into a target optical fiber adapter, the method further includes: obtaining a location corresponding to the target optical fiber adapter.

In a possible implementation, the method includes: controlling the insertion and removal robot to remove the target optical fiber connector from the initial optical fiber adapter, and release the target optical fiber connector; controlling the first fiber accommodating mechanism to retract the target optical fiber connector and the optical fiber connected to the target optical fiber connector to the connector retracting portion; controlling the clamp jaw robot to take out the target optical fiber connector from the connector retracting portion, and transfer the target optical fiber connector to the insertion and removal robot; and controlling the insertion and removal robot to receive the target optical fiber connector and insert the target optical fiber connector into the target optical fiber adapter.

In a possible implementation, the transferring the target optical fiber connector to the insertion and removal robot includes: controlling the clamp jaw robot to transfer the target optical fiber connector to the transit robot; and controlling the transit robot to transfer the target optical fiber connector to the insertion and removal robot.

In a possible implementation, the method further includes: controlling the transit robot synchronous belt assembly to drive the transit robot to move.

In a possible implementation, the method further includes: controlling the clamp jaw robot synchronous belt assembly to move the clamp jaw robot.

In a possible implementation, the method further includes: controlling the insertion and removal robot synchronous belt assembly to move the insertion and removal robot.

In a possible implementation, the method further includes: controlling the column change robot to transfer the insertion and removal robot from an initial insertion and removal robot track to a target insertion and removal robot track.

In a possible implementation, the controlling the column change robot to transfer the insertion and removal robot from an initial insertion and removal robot track to a target insertion and removal robot track includes: controlling the column change synchronous belt assembly and an insertion and removal robot synchronous belt assembly corresponding to the initial insertion and removal robot track to move the insertion and removal robot to the column change track; controlling the lead screw mechanism to move the column change robot to a location corresponding to the target insertion and removal robot track; and controlling the column change synchronous belt assembly and an insertion and removal robot synchronous belt assembly corresponding to the target insertion and removal robot track to move the column change robot to the target insertion and removal robot track.

In a possible implementation, the method includes: controlling the distribution robot to remove the target optical fiber connector from the initial optical fiber adapter, and release the target optical fiber connector; controlling the second fiber accommodating mechanism to retract the target optical fiber connector and the optical fiber connected to the target optical fiber connector to the connector retracting portion; and controlling the distribution robot to take out the target optical fiber connector from the connector retracting portion, and insert the target optical fiber connector into the target optical fiber adapter.

According to a third aspect, an optical fiber scheduling system is provided, where the system includes a controller and the optical fiber distribution device according to any one of the first aspect, and the controller is configured to perform the optical fiber scheduling method according to any one of the second aspect.

According to a fourth aspect, a computer-readable storage medium is provided, including instructions, where when the computer-readable storage medium runs on an optical fiber distribution device, the optical fiber distribution device is enabled to perform the method according to any one of the second aspect.

According to a fifth aspect, a computer program product including instructions is provided. When the computer program product runs on an optical fiber distribution device, the optical fiber distribution device performs the method according to any one of the second aspect.

According to a sixth aspect, a chip is provided, including a programmable logic circuit and/or program instructions, where when the chip runs, the chip is configured to implement the method according to any one of the second aspect.

Beneficial effects brought by the technical solutions provided in embodiments of the present disclosure are as follows.

This application discloses an optical fiber distribution device. The optical fiber distribution device can implement automatic optical fiber scheduling. In addition, when scheduling optical fibers, the optical fiber distribution device retracts an optical fiber connector and an optical fiber to the connector retracting portion, and winding between the optical fiber connected to the target optical fiber connector and other optical fibers is avoided in the retracting process, so that an insertion and removal robot does not need to travel in a complex route to bypass all optical fibers that may be wound, thereby greatly reducing time for optical fiber scheduling.

REFERENCE NUMERALS

Figure 1:
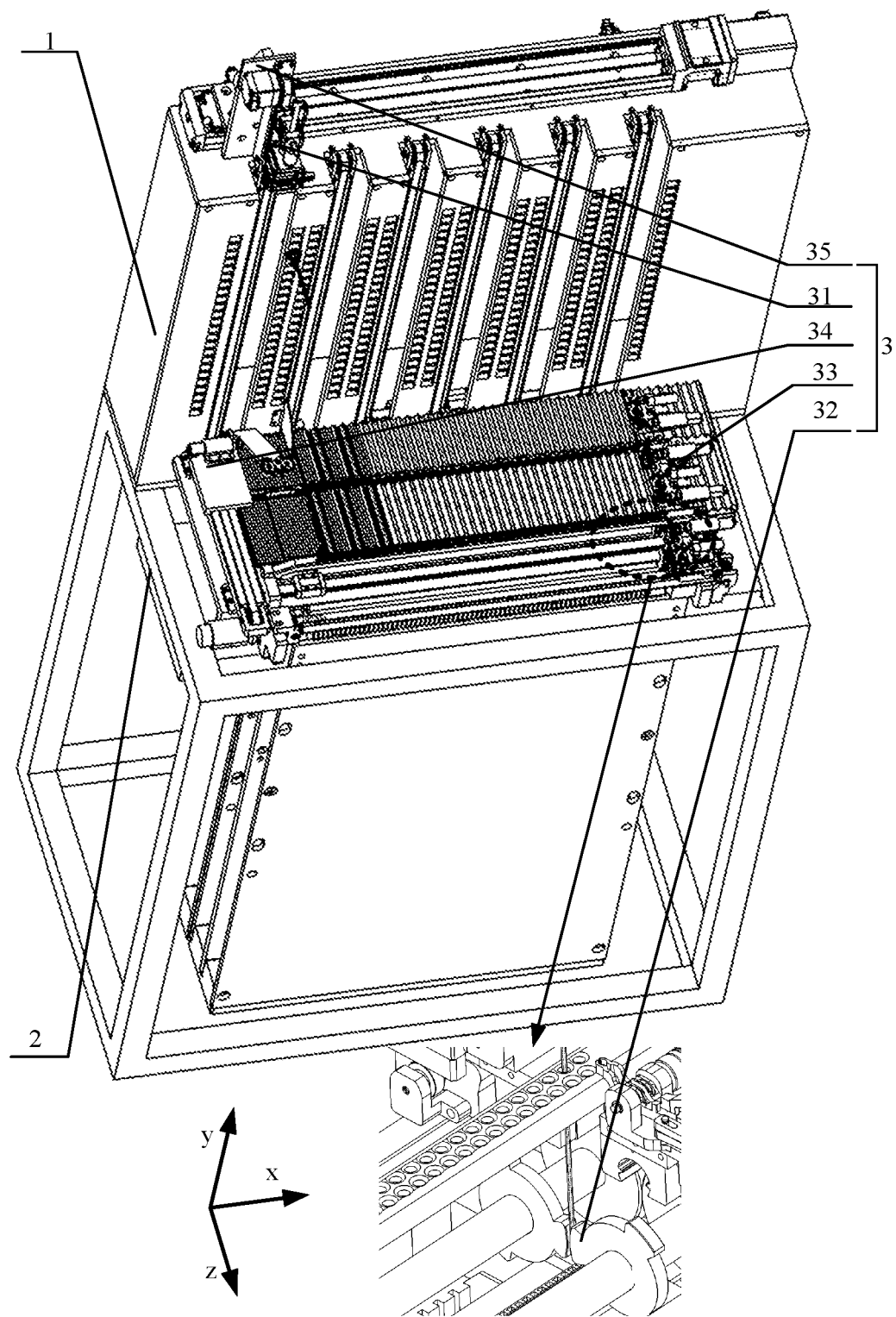
FIG. 1 is a schematic diagram of an optical fiber distribution device according to an embodiment of the present disclosure.

1. Distribution portion;
11. Insertion and removal robot track, 12. Insertion and removal robot synchronous belt assembly, 121. Insertion and removal robot synchronous belt, and 122. Insertion and removal robot rotating wheel;
13. Lead screw mechanism, 131. Lead screw mechanism base, 132. Transmission lead screw, 133. Lead screw mechanism driving motor, and 134. Fixed base;
2. Connector retracting portion;
20. Optical fiber connector;
21. Connector parking area, 211. Connector accommodating base, 2111. Connector retracting hole, 212. Transit robot track, 213. Transit robot synchronous belt assembly, 2131. Transit robot synchronous belt, 2132. Transit robot rotating wheel, 214. Clamp jaw robot guide rail, 215. Clamp jaw robot synchronous belt assembly, 2151. Clamp jaw robot synchronous belt, and 2152. Clamp jaw robot rotating wheel;
22. Active fiber accommodating area;
23. Fiber storage area, 231. Fiber storage cavity, and 232. Gravity ring;
3. Robot system;
31. Insertion and removal robot, 311. Insertion and removal robot base, 312. Insertion and removal base, 3121. Support plate, 312a. Insertion and removal driving motor, 312b. Insertion and removal driving lead screw, 313. Clamping base, 313a. Clamping driving motor, 313b. Clamping driving lead screw, 314. Clamping arm, 314a. Telescopic driving motor, and 314b. Gear column;
32. First fiber accommodating mechanism, 320. Fiber accommodating unit, 321. Rotating shaft, 322. Fiber accommodating wheel, 3221. Protrusion portion, 323a. Rotating shaft motor, 323b. Rotating shaft driving gear, and 323c. Rotating shaft driven gear;
33. Clamp jaw robot, 331. Clamp jaw robot base, 332. Transverse movable base, 332a. Transverse movable base driving motor, 332b. Transverse movable base driving gear, 333. Clamping mechanism, 3330. Clamping driving apparatus, 3331. Driving connecting rod, 33311. Connection hole, 3332. Clamping arm, 33321. Connection protrusion, 3333. Follow-up connecting rod, 33331. Follow-up connection hole, 334. Clamp jaw pair, 335. Clamp jaw rotation driving apparatus, and 336. Clamping plate;
34. Transit robot, 341. Transit robot base, 342. Overturning driving apparatus, 3421. Overturning driving motor, 3422. Overturning driving gear, 3423. Overturning driven gear, 343. Overturning plate, and 3431. Connector carrying hole;
35. Column change robot, 351. Column change robot base, 352. Column change track, 353. Column change synchronous belt assembly, 3531. Column change synchronous belt, and 3532. Column change rotating wheel;
36. Distribution robot, 361. First guide rail, 361a. First motor, 361b. First synchronous belt, 362. Second guide rail, 362a. Second motor, 362b. Second synchronous belt, 363. Third guide rail, 363a. Third motor, 363b. Third lead screw, 364. Clamping mechanism, 3641. First clamping arm, 3642. Second clamping arm, and 3643. Clamping driving apparatus; and
37. Second fiber accommodating mechanism, 371. Second rotating shaft, and 372. Second fiber accommodating wheel.

DESCRIPTION OF EMBODIMENTS

An embodiment of the present disclosure provides an optical fiber distribution device. The optical fiber distribution device may implement automatic fiber scheduling, and may be used in any scenario that has an optical fiber scheduling requirement. For example, the optical fiber distribution device may be used in scenarios such as a data center, an upstream ODF of an ODN, and a street cabinet.

Figure 20:
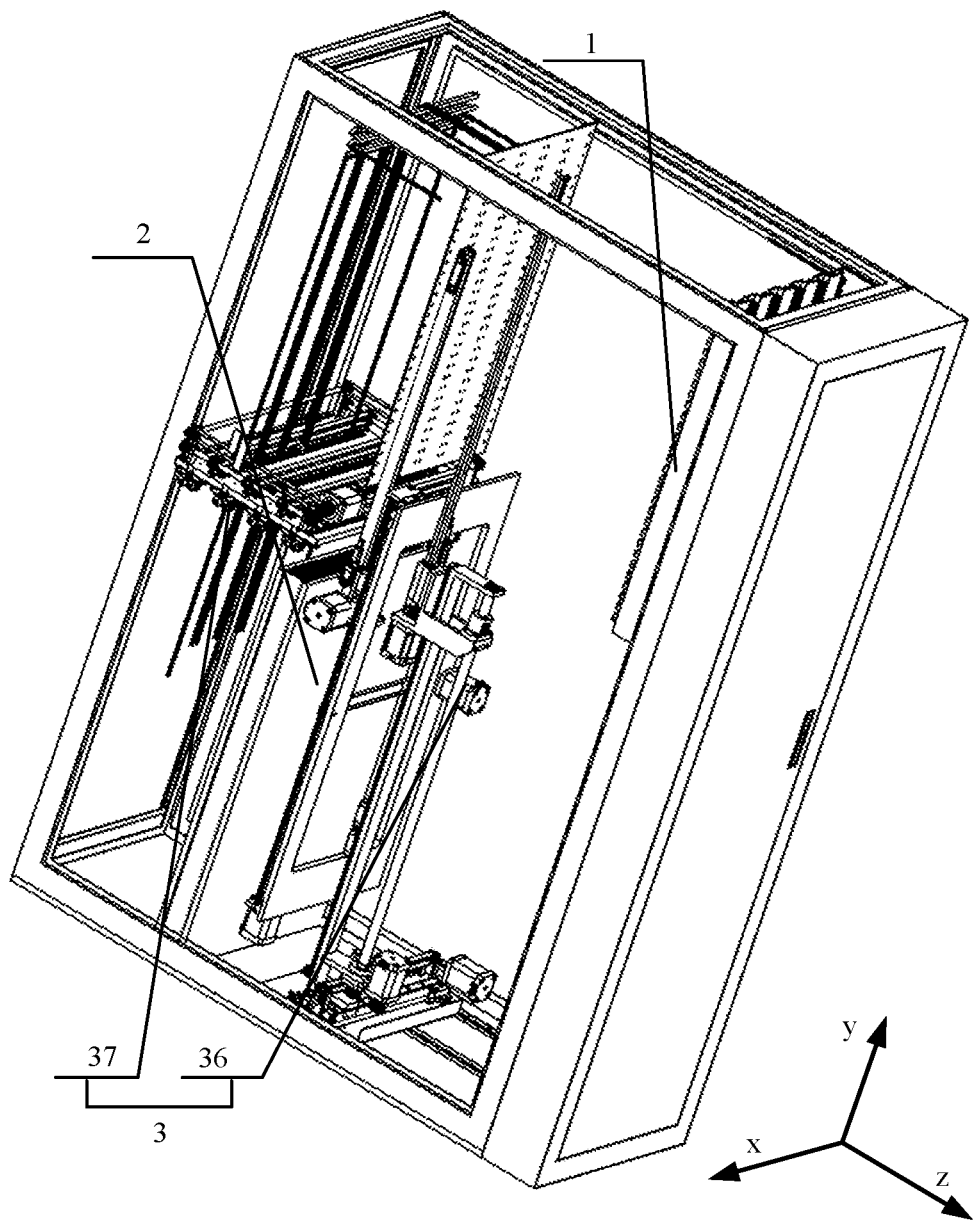
FIG. 20 is a schematic diagram of an optical fiber distribution device according to an embodiment of the present disclosure.

An embodiment of the present disclosure provides an optical fiber distribution device. As shown in FIG. 1 and FIG. 20, the optical fiber distribution device includes a distribution portion 1, a connector retracting portion 2, and a robot system 3. The distribution portion 1 is provided with an optical fiber adapter, and the optical fiber adapter is configured to connect to an optical fiber connector connected to an optical fiber. The connector retracting portion 2 is configured to accommodate the optical fiber connector and the optical fiber connected to the optical fiber connector. The robot system 3 is configured to remove a target optical fiber connector from an initial optical fiber adapter; retract the target optical fiber connector and an optical fiber connected to the target optical fiber connector to the connector retracting portion 2; and take out the target optical fiber connector from the connector retracting portion 2 and insert the target optical fiber connector into a target optical fiber adapter.

The distribution portion 1 is provided with the optical fiber adapter configured to connect to the optical fiber connector, so that the optical fiber adapter is connected to the optical fiber connector at the distribution portion 1.

The connector retracting portion 2 is configured to accommodate the optical fiber connector and the optical fiber connected to the optical fiber connector. The connector retracting portion 2 includes a plurality of connector accommodating holes 2111, and the plurality of connector accommodating holes one-to-one correspond to a plurality of optical fiber connectors, so that the optical fiber distribution device determines locations of the optical fiber connectors by using the connector accommodating holes. When the robot system 3 needs to operate an optical fiber connector, the robot system may first drive a corresponding robot or mechanism to move to near a connector accommodating hole corresponding to the optical fiber connector, and then perform a corresponding operation on the optical fiber connector or an optical fiber corresponding to the connector accommodating hole. For example, when a target optical fiber connector and a connected optical fiber are retracted to the connector retracting portion 2, the robot system 3 retracts an optical fiber connector to which an optical fiber passing through a target connector accommodating hole is connected to the target connector accommodating hole, and retracts the optical fiber to the connector retracting portion. When the target optical fiber connector is taken out of the connector retracting portion 2, the robot system 3 takes out the optical fiber connector from the target connector accommodating hole. In this way, it can be ensured that an accommodating location of the optical fiber connector is determined and unique. The connector retracting portion 2 may be divided into three areas, which are respectively a connector parking area 21, an active fiber accommodating area 22, and a fiber storage area 23 in a direction of the optical fiber, and the connector parking area 21 is close to the optical fiber connector. The connector parking area 21 is used to park an optical fiber connector, the active fiber accommodating area 22 is provided with a mechanism capable of actively accommodating a fiber, and the fiber storage area 23 is used to store an optical fiber.

The robot system 3 is a main operation component of the optical fiber distribution device, and can implement actions of inserting and removing the optical fiber connector into and from the optical fiber adapter, a retracting action of accommodating the optical fiber connector and the optical fiber to the connector retracting portion 2, an action of taking out the optical fiber connector from the connector retracting portion 2, and the like. The robot system 3 may be implemented in a plurality of manners. This is not specifically limited in the present disclosure.

In addition, the optical fiber distribution device may further include a controller, so that the controller can control the robot system 3 and various driving mechanisms, to complete automatic optical fiber scheduling. To ensure accuracy of actions of the robot system 3 and various driving mechanisms, the optical fiber distribution device may further include various sensors, so that the controller can implement closed-loop control based on data fed back by the sensors.

The optical fiber distribution device provided in this embodiment of the present disclosure can implement automatic optical fiber scheduling. When a target optical fiber connector is scheduled from an initial optical fiber adapter to a target optical fiber adapter, the target optical fiber connector is first removed from the initial optical fiber adapter, and then the target optical fiber connector and an optical fiber are retracted to the connector retracting portion. In a retracting process, the target optical fiber connector and the optical fiber are retracted from a wound optical fiber cluster (if there is an optical fiber cluster), to avoided winding between the optical fiber connected to the target optical fiber connector and other optical fibers. Then, the target optical fiber connector is taken out of the connector retracting portion 2, and finally is inserted into the target optical fiber adapter indicated by a scheduling instruction.

It can be learned that, in an optical fiber scheduling process, the optical fiber distribution device provided in this embodiment of the present disclosure retracts an optical fiber connector and an optical fiber to the connector retracting portion, and winding between the optical fiber connected to the target optical fiber connector and other optical fibers is avoided in the retracting process, so that an insertion and removal robot does not need to travel in a complex route to bypass all optical fibers that may be wound, thereby greatly reducing time for optical fiber scheduling.

Figure 5:
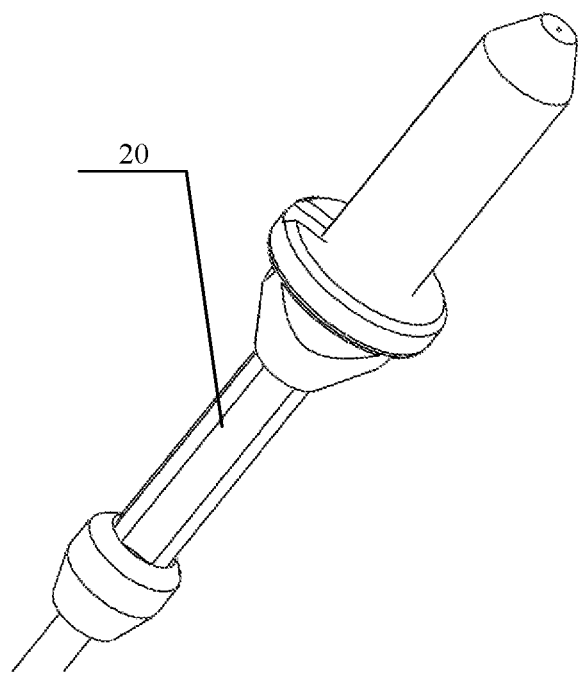
FIG. 5 is a schematic diagram of an optical fiber connector according to an embodiment of the present disclosure.

To ensure that the optical fiber and the optical fiber connector can be smoothly retracted from the optical fiber cluster, as shown in FIG. 5, the optical fiber connector is provided with a guide structure in an axial direction (for example, the guide structure is a rounded structure and/or a chamfered structure), and an outer diameter of the optical fiber connector is one to five times an outer diameter of the optical fiber connected to the optical fiber connector. In this way, the optical fiber connector has a small outer diameter and the guide structure, and is not easily hung by the optical fiber.

Figure 4:
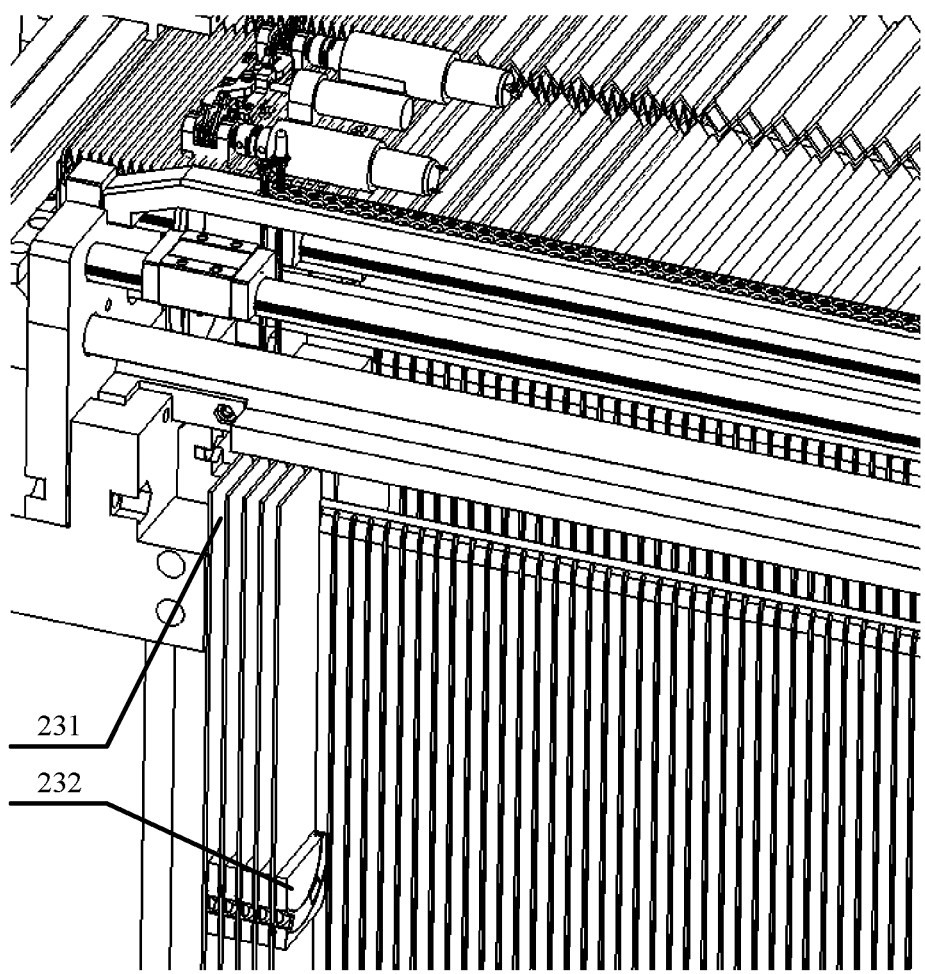
FIG. 4 is a schematic diagram of a fiber storage area according to an embodiment of the present disclosure.
Figure 6:
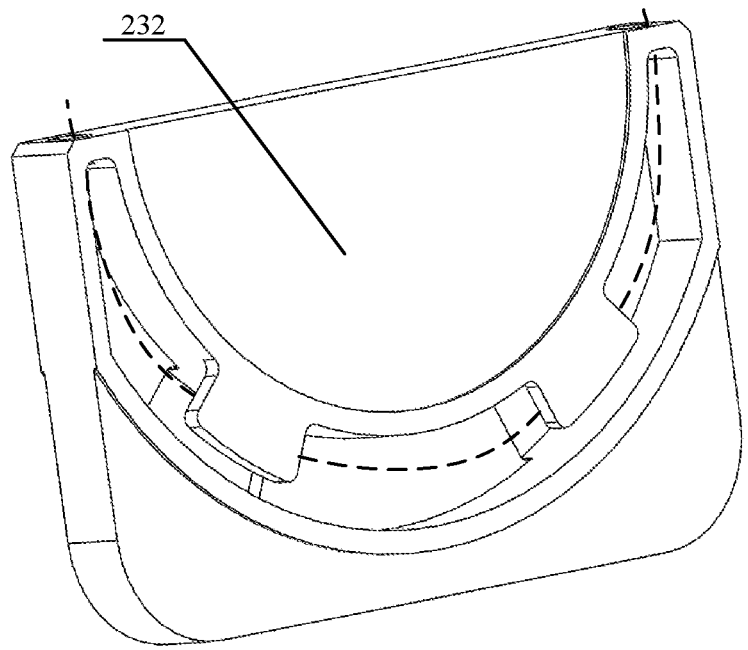
FIG. 6 is a schematic diagram of a gravity ring according to an embodiment of the present disclosure.

In addition, the optical fiber may be kept in a semi-tensioned state, so that the optical fiber is less likely to be hung by the optical fiber cluster, thereby ensuring operability of retracting the optical fiber. In addition, the optical fiber is not wound and knotted due to an excessive extra length of the optical fiber. To implement the semi-tensioned state of the optical fiber, as shown in FIG. 4 and FIG. 6, the fiber storage area 23 may further include a gravity ring 232. Each fiber storage cavity 231 is provided with a gravity ring 232, and the gravity ring 232 may be hung on an optical fiber in the fiber storage cavity 231, so that a tensioned pulling force is applied to the optical fiber by using gravity of the gravity ring. For example, the optical fiber may be wound on the gravity ring 232 in a winding manner shown by a dashed line in FIG. 5. In addition, a low-friction jacket may be used for the optical fiber to reduce friction between the optical fibers.

Because the optical fiber is in the semi-tensioned state rather than a completely stretched state. Therefore, the optical fiber may be a common optical fiber instead of a customized tension-resistant optical fiber, which reduces manufacturing costs of the optical fiber.

The following describes the optical fiber distribution device provided in this embodiment of the present disclosure with reference to FIG. 1 to FIG. 19.

As shown in FIG. 1, a distribution panel and a connector retracting panel (that is, the connector parking area 21) of the optical fiber distribution device are perpendicular to each other.

Figure 2:
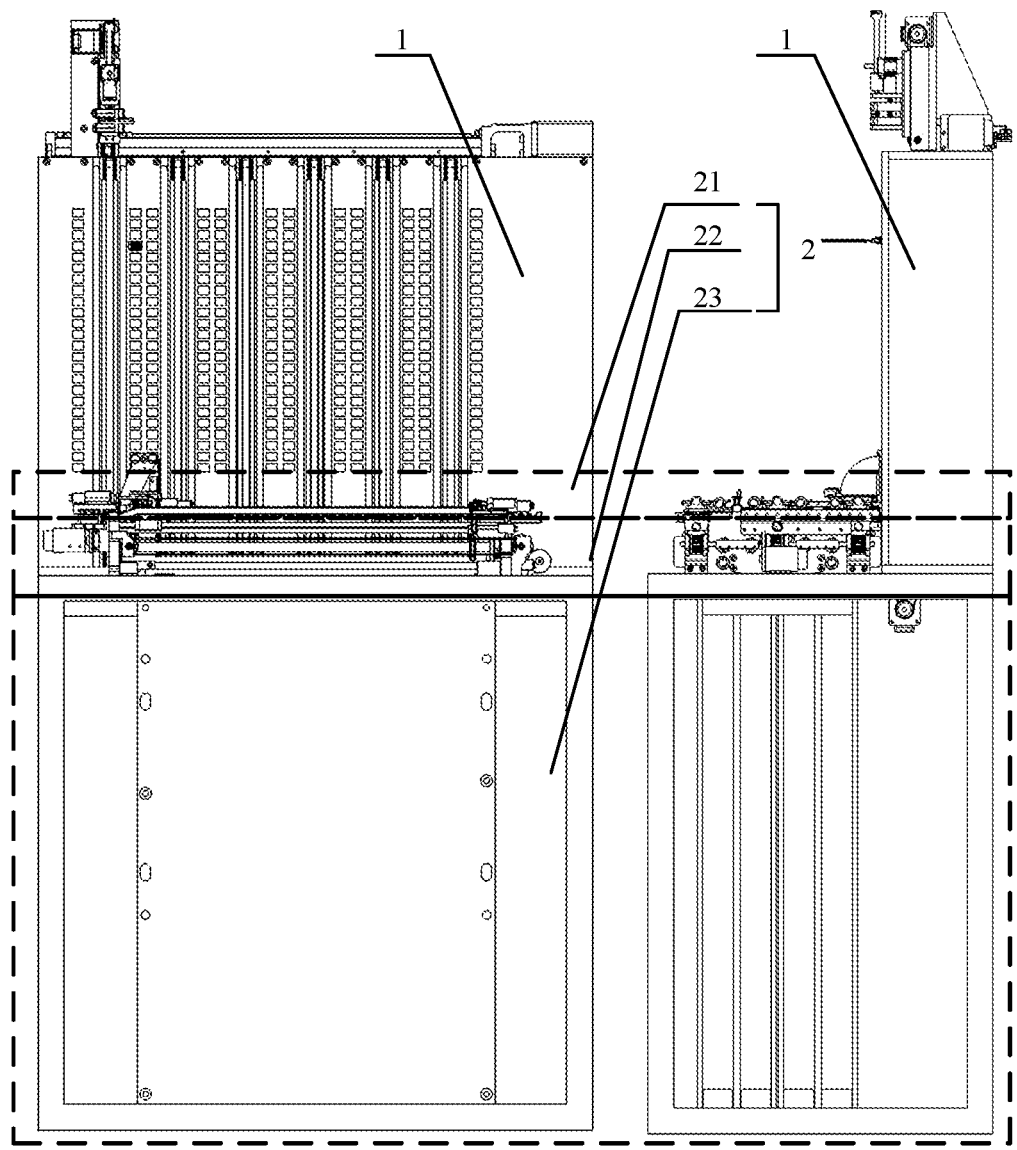
FIG. 2 is a schematic diagram of an optical fiber distribution device according to an embodiment of the present disclosure.

As shown in FIG. 2, the connector retracting portion 2 may be divided into three areas, which are respectively the connector parking area 21, the active fiber accommodating area 22, and the fiber storage area 23 from top to bottom.

Figure 3A:
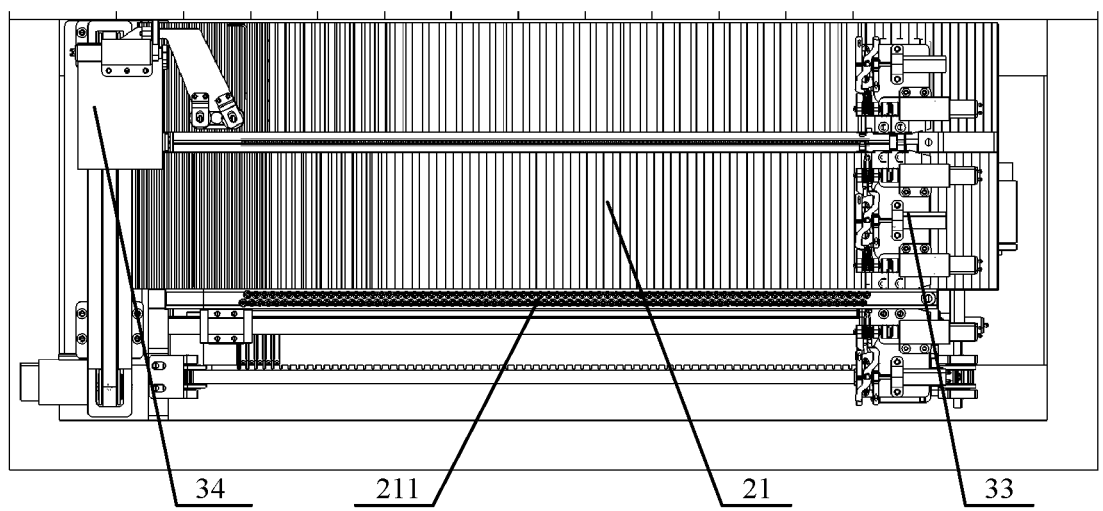
FIG. 3A is a schematic diagram of a connector parking area according to an embodiment of the present disclosure.
Figure 3B:
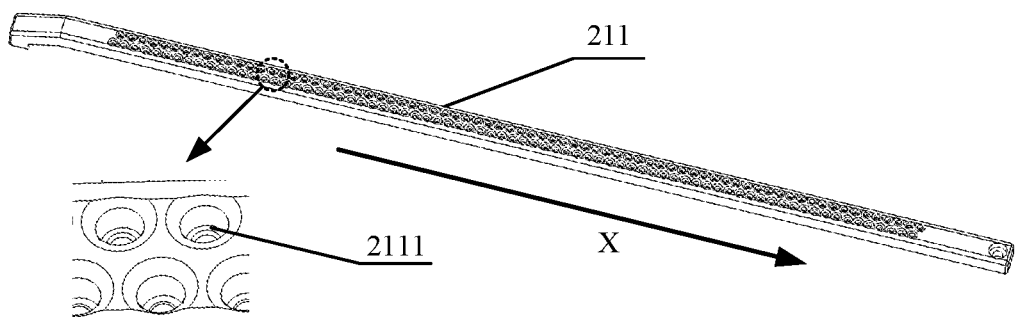
FIG. 3B is a schematic diagram of a connector accommodating base according to an embodiment of the present disclosure.

The connector parking area 21 is used to park an optical fiber connector, and the connector parking area 21 is provided with one or more connector accommodating bases 211, as shown in FIG. 3A. As shown in FIG. 3B, the connector accommodating base 211 is provided with a plurality of connector accommodating holes 2111, and the plurality of connector accommodating holes 2111 may be arranged in a direction (an x direction shown by an arrow in the figure) parallel to the distribution portion 1. Each connector accommodating hole 2111 is configured to accommodate an optical fiber connector, and an optical fiber connected to the optical fiber connector passes through the connector accommodating hole 2111. In a possible implementation, to facilitate accommodating the optical fiber connector, the connector accommodating hole 2111 may be a stepped hole, and the optical fiber connector may be parked on a stepped base of the stepped hole.

The active fiber accommodating area 22 is provided with a mechanism that can accommodate an optical fiber. A fiber accommodating principle of the mechanism may be that an optical fiber connector is accommodated in the connector parking area 21 by dragging an optical fiber of the optical fiber connector, and the optical fiber is accommodated in the fiber storage area 23.

The fiber storage area 23 is used to store the optical fiber connected to the optical fiber connector. To prevent the stored optical fiber from being wound, as shown in FIG. 4, the fiber storage area 23 may be provided with a plurality of fiber storage cavities 231 that are spaced apart from each other (only four fiber storage cavities are shown in the figure as an example for description), and each fiber storage cavity 231 is configured to accommodate one optical fiber. In addition, the plurality of fiber storage cavities 231 one-to-one correspond to the plurality of connector accommodating holes 2111.

As shown in FIG. 1, the robot system 3 includes an insertion and removal robot 31, a first fiber accommodating mechanism 32, and a clamp jaw robot 33. The insertion and removal robot 31 is located on the distribution portion 1, and is configured to insert and remove the optical fiber connector into and from the optical fiber adapter. The first fiber accommodating mechanism 32 is located in the active fiber accommodating area 22 of the connector retracting portion 2, and is configured to retract the optical fiber connector and the optical fiber connected to the optical fiber connector to the connector retracting portion 2. The clamp jaw robot 33 is located in the connector parking area 21 of the connector retracting portion 2, and is configured to take out the optical fiber connector from the connector retracting portion 2, and transfer the taken-out optical fiber connector to the insertion and removal robot 31.

The following describes in detail the insertion and removal robot 31, the first fiber accommodating mechanism 32, and the clamp jaw robot 33 according to a working sequence of the robots in the optical fiber scheduling process.

(1) First, the insertion and removal robot 31 needs to remove a target optical fiber connector from an initial optical fiber adapter and release the target optical fiber connector.

Figure 7:
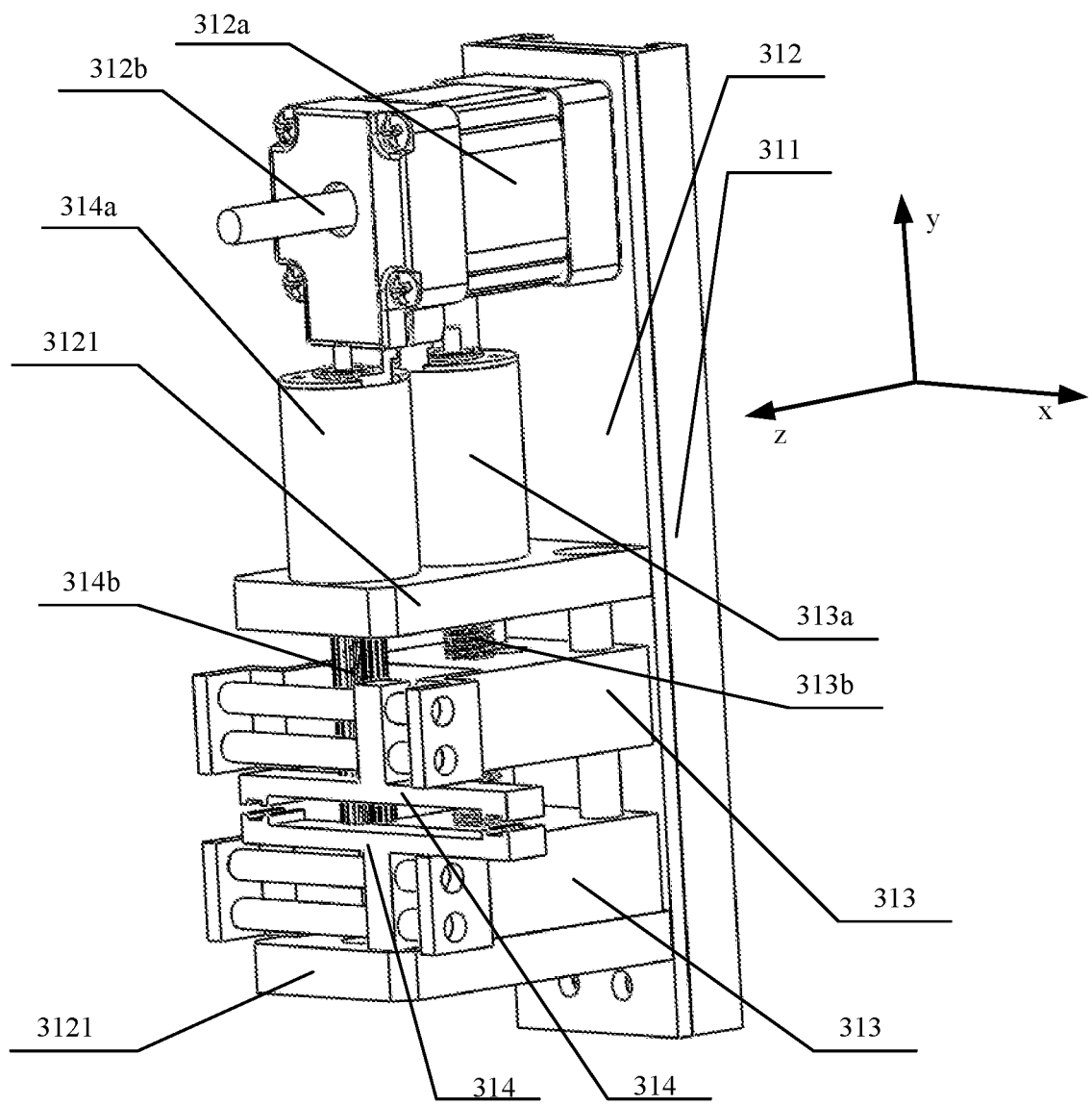
FIG. 7 is a schematic diagram of an insertion and removal robot according to an embodiment of the present disclosure.

As shown in FIG. 7, the insertion and removal robot 31 includes an insertion and removal robot base 311, an insertion and removal base 312, two clamping bases 313, and two clamping arms 314. The insertion and removal base 312 is slidably connected to the insertion and removal robot base 311 in a first direction (that is, a x direction), and the first direction is perpendicular to the distribution portion 1. The two clamping bases 313 are located on the insertion and removal base 312, and are slidably connected to the insertion and removal base 312 in a second direction (that is, a y direction), the second direction is parallel to an axis direction of a clamp jaw robot guide rail 214, and movement directions of the two clamping bases 313 are opposite. The two clamping arms 314 are respectively located on the two clamping bases 313, the clamping arms 314 are slidably connected to the clamping bases 313 in a third direction (that is, the z direction), and the third direction is perpendicular to both the first direction and the second direction.

The insertion and removal robot base 311 may include two support plates 3121 configured to mount a driving mechanism of the clamping arm 314 and a driving mechanism of the clamping base 313. A clamping groove may be provided at an end portion of the clamping arm 314, to facilitate clamping of the optical fiber connector. To enable the insertion and removal robot 31 to be responsible for inserting and removing more optical fiber connectors, both ends of the clamping arm 314 may be provided with clamping grooves, so that the insertion and removal robot 31 may be responsible for inserting and removing optical fiber connectors on two sides.

The insertion and removal base 312 is slidably connected to the insertion and removal robot base 311 in the z direction, and both the two clamping arms 314 are located on the insertion and removal base 312. Therefore, the insertion and removal base 312 can drive the two clamping arms 314 to move bidirectionally in the z direction, to implement an insertion action and a removal action on the optical fiber connector.

The two clamping bases 313 are slidably connected to the insertion and removal base 312 in the y direction, and the movement directions of the two clamping bases 313 are opposite. In addition, the two clamping arms 314 are respectively located on the two clamping bases 313. Therefore, the clamping bases 313 can drive the two clamping arms 314 to move away from each other or closer to each other in the y direction, to implement a clamping action and a loosening action on the optical fiber connector.

The two clamping arms 314 are slidably connected to the clamping bases 313 in the x direction. Therefore, the two clamping arms 314 can extend out and retract relative to the clamping bases 313, to implement an action of avoiding the optical fiber adapter by the insertion and removal robot 31. In a traveling state of the insertion and removal robot 31, the two clamping arms 314 may retract to avoid the optical fiber adapter. In an insertion and removal state of the insertion and removal robot 31, the two clamping arms 314 extend out.

In this embodiment of the present disclosure, a driving manner of the insertion and removal base 312, the clamping base 313, and the clamping arm 314 is not specifically limited. For example, a possible implementation is provided.

As shown in FIG. 7, a driving apparatus of the insertion and removal base 312 includes an insertion and removal driving motor 312a and an insertion and removal driving lead screw 312b. The insertion and removal driving motor 312a is fixed on the insertion and removal base 312, and the insertion and removal driving lead screw 312b is rotatably connected to the insertion and removal robot base 311. The insertion and removal base 312 is provided with a nut structure that matches the insertion and removal driving lead screw 312b. When the insertion and removal driving motor 312a drives the insertion and removal driving lead screw 312b to rotate, the insertion and removal driving lead screw 312b drives the insertion and removal base 312 to move in a direction perpendicular to the distribution portion 1 (that is, move in a z-axis direction), to implement the insertion and removal actions on the optical fiber connector.

A driving apparatus of the clamping base 313 includes a clamping driving motor 313a and a clamping driving lead screw 313b. The clamping driving motor 313a is located on a support plate 3121 of the insertion and removal base 312, and an output shaft of the clamping driving motor 313a is fixedly connected to the clamping driving lead screw 313b. The clamping driving lead screws 313b pass through the two clamping bases 313, and the two clamping bases 313 are provided with nut structures that match the clamping driving lead screws 313b. In addition, to implement opposite movement directions of the two clamping bases 313, the clamping driving lead screws 313b have two opposite rotation directions (correspondingly, rotation directions of the two nut structures are also opposite), and the two rotation directions respectively correspond to the two clamping bases 313. When the clamping driving motor 313a drives the clamping driving lead screws 313b to rotate, the clamping driving lead screws 313b drive the two clamping bases 313 to drive the two clamping arms 314 to move closer to each other or away from each other (that is, move opposite to each other in a y-axis direction), to implement the clamping action.

A driving apparatus of the clamping arm 314 includes a telescopic driving motor 314a and a gear column 314b. The telescopic driving motor 314a is located on the support plate 3121 of the insertion and removal base 312. An output shaft of the telescopic driving motor 314a is fixedly connected to the gear column 314b, and the gear column 314b is engaged with the two clamping arms 314 (the two clamping arms 314 are provided with rack structures). When the telescopic driving motor 314a drives the gear column 314b to rotate, the gear column 314b drives the two clamping arms 314 to extend and retract relative to the clamping bases 313 (that is, move in the x direction), to implement the action of avoiding the optical fiber adapter.

To enable the insertion and removal robot 31 to be responsible for inserting and removing more optical fiber connectors, the insertion and removal robot 31 may further move on the distribution portion 1. A specific implementation of movement of the insertion and removal robot 31 is not specifically limited in the present disclosure. The following provides a possible implementation.

Figure 8:
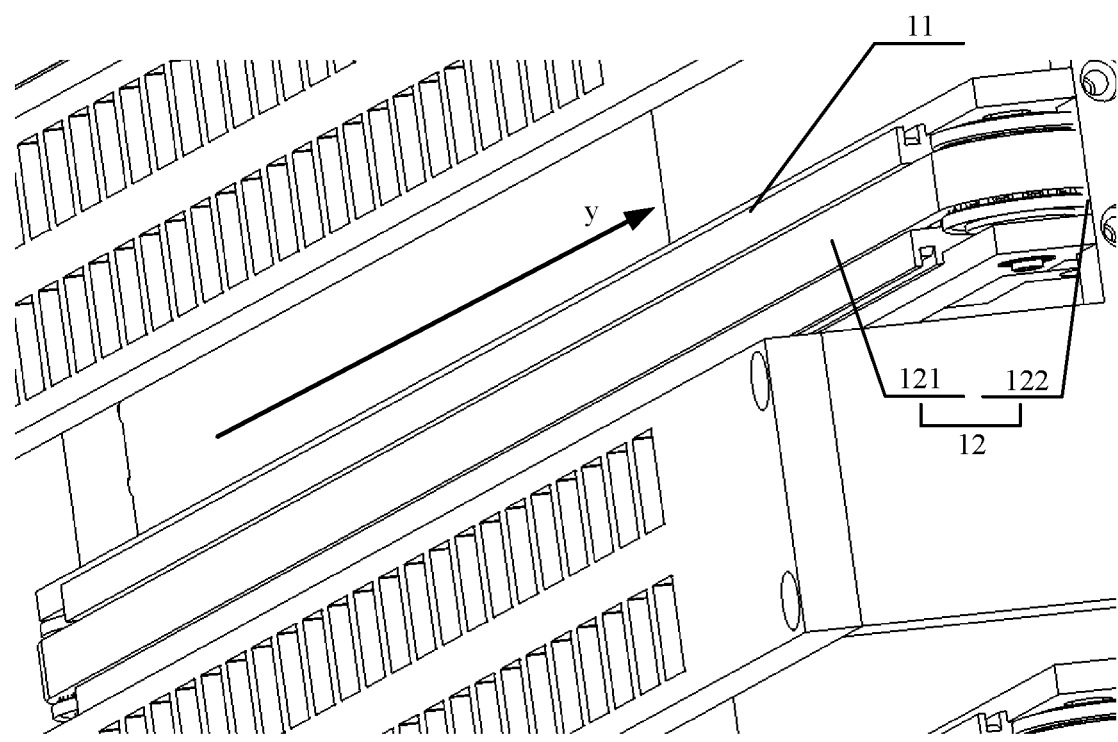
FIG. 8 is a schematic diagram of a driving mechanism of an insertion and removal robot according to an embodiment of the present disclosure.

As shown in FIG. 8, the distribution portion 1 includes an insertion and removal robot track 11 and an insertion and removal robot synchronous belt assembly 12, and the insertion and removal robot synchronous belt assembly 12 is located inside the insertion and removal robot track 11. The insertion and removal robot track 11 is located on one side of at least one column of optical fiber adapters (which are arranged in the y direction). The insertion and removal robot 31 matches the insertion and removal robot track 11 and is engaged with the insertion and removal robot synchronous belt assembly 12 (not shown in the figure).

The insertion and removal robot track 11 and the insertion and removal robot synchronous belt assembly 12 are located in grooves of the distribution portion 1 that are arranged in the y direction, to align the insertion and removal robot 31 with the optical fiber connector, and prevent the insertion and removal robot 31 from being excessively higher than the optical fiber connector.

The insertion and removal robot track 11 matches the insertion and removal robot base 311 to form a linear motion pair. The insertion and removal robot track 11 can limit the insertion and removal robot base 311, so that the insertion and removal robot 31 can move along only the insertion and removal robot track 11 and is not separated from the insertion and removal robot track 11. Power for the insertion and removal robot 31 to move may be provided by the insertion and removal robot synchronous belt assembly 12.

The insertion and removal robot synchronous belt assembly 12 includes an insertion and removal robot synchronous belt 121 and an insertion and removal robot rotating wheel 122. Synchronous teeth are disposed on both an outer wall of the insertion and removal robot rotating wheel 122 and an inner side of the insertion and removal robot synchronous belt 121 and are engaged with each other, so that the insertion and removal robot rotating wheel 122 can drive the insertion and removal robot synchronous belt 121 to rotate. In addition, synchronous teeth are also disposed on both an outer side of the insertion and removal robot synchronous belt 121 and the insertion and removal robot base 311 and are engaged with each other, so that the insertion and removal robot synchronous belt 121 can drive the insertion and removal robot 31 to move. The insertion and removal robot rotating wheel 122 may be driven by a motor.

Figure 9:
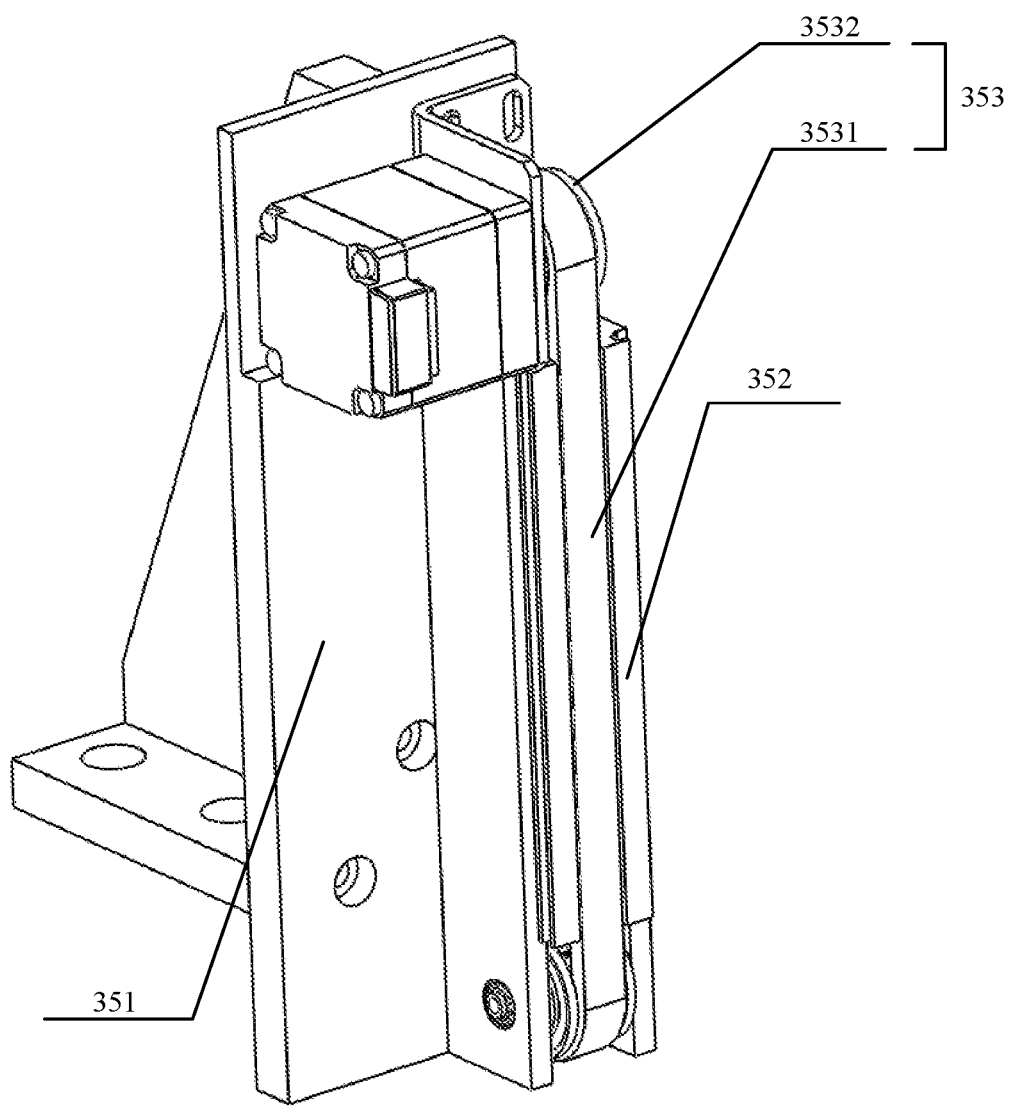
FIG. 9 is a schematic diagram of a column change robot according to an embodiment of the present disclosure.

When there are a plurality of columns of insertion and removal robot tracks 11, the insertion and removal robot 31 needs to be switched on different columns of insertion and removal robot tracks 11. To implement this switching action, as shown in FIG. 9, the robot system 3 may further include a column change robot 35. The column change robot 35 is located on the distribution portion 1, and is configured to transfer the insertion and removal robot 31 to different insertion and removal robot tracks 11.

Figure 10:
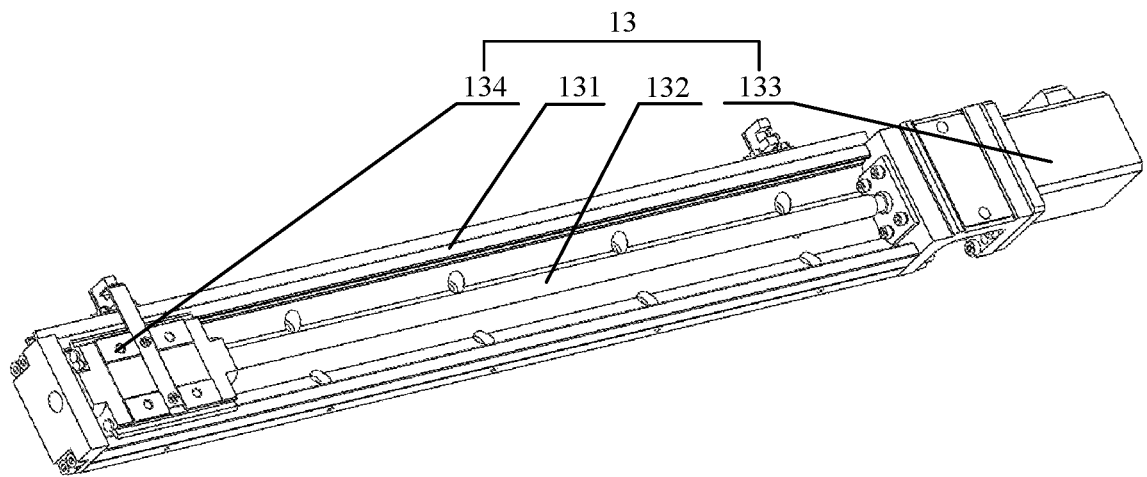
FIG. 10 is a schematic diagram of a lead screw mechanism according to an embodiment of the present disclosure.

As shown in FIG. 9, the column change robot 35 includes a column change robot base 351, a column change track 352, and a column change synchronous belt assembly 353, the column change track 352 is fixed on the column change robot base 351, and the column change synchronous belt assembly 353 is located inside the column change track 352. As shown in FIG. 10, the distribution portion 1 further includes a lead screw mechanism 13, an axis direction of the lead screw mechanism 13 is parallel to an arrangement direction of the plurality of columns of insertion and removal robot tracks 11, and the column change robot base 351 matches the lead screw mechanism 13. In a column change state of the insertion and removal robot 31, the insertion and removal robot 31 matches the column change track 352 and is engaged with the column change synchronous belt assembly 353.

The column change track 352 may match the insertion and removal robot base 311 to form a linear motion pair. The column change track 352 can limit the insertion and removal robot base 311, so that the insertion and removal robot 31 can move along only the column change track 352 without excessive shaking.

The column change synchronous belt assembly 353 includes a column change synchronous belt 3531 and a column change rotating wheel 3532. Synchronous teeth are disposed on both an outer wall of the column change rotating wheel 3532 and an inner side of the column change synchronous belt 3531 and are engaged with each other, so that the column change rotating wheel 3532 can drive the column change synchronous belt 3531. In addition, synchronous teeth are also disposed on both an outer side of the column change synchronous belt 3531 and the insertion and removal robot base 311 and may be engaged with each other, so that the column change synchronous belt 3531 can drive the insertion and removal robot 31 to the column change robot 35.

A principle of carrying the insertion and removal robot 31 by the column change robot 35 is as follows.

The insertion and removal robot synchronous belt 121 drives the insertion and removal robot 31 to move upward along the insertion and removal robot track 11. When the insertion and removal robot moves to the column change robot 35, the insertion and removal robot base 351 matches the column change track 352. The insertion and removal robot synchronous belt 121 and the column change synchronous belt 3531 jointly drive the insertion and removal robot 31 to continue to move upward until the insertion and removal robot base 351 is separated from the insertion and removal robot synchronous belt 121. Because of the limiting function of the synchronous teeth on the column change track 352 and the outer side of the column change synchronous belt assembly 353, the insertion and removal robot 31 may stay on the column change robot 35.

As shown in FIG. 10, the lead screw mechanism 13 includes a lead screw mechanism base 131, a transmission lead screw 132, a lead screw mechanism driving motor 133, and a fixed base 134. The transmission lead screw 132, the lead screw mechanism driving motor 133, and the fixed base 134 are all located on the lead screw mechanism base 131, the lead screw mechanism driving motor 133 drives the transmission lead screw 132 to rotate, and the fixed base 134 is provided with a nut structure that matches the transmission lead screw 132. When the transmission lead screw 132 rotates, the transmission lead screw 132 drives the fixed base 134 to perform linear movement in a horizontal direction.

Figure 11A:
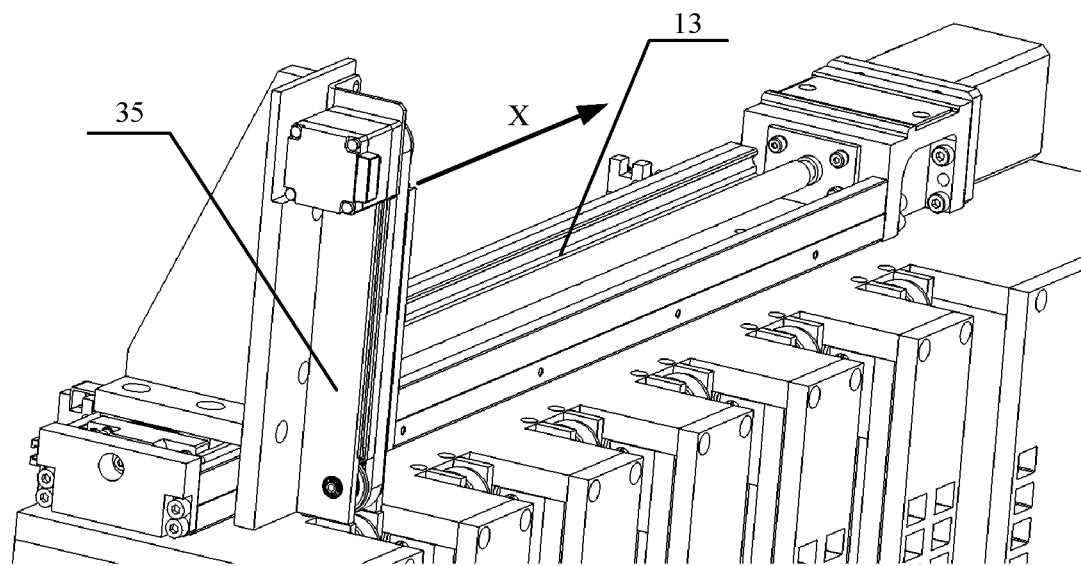
FIG. 11A is a schematic diagram of a lead screw mechanism and a column change robot according to an embodiment of the present disclosure.

As shown in FIG. 11A, the lead screw mechanism 13 and the column change robot 35 may be located on the top of the distribution portion 1.

Figure 11B:
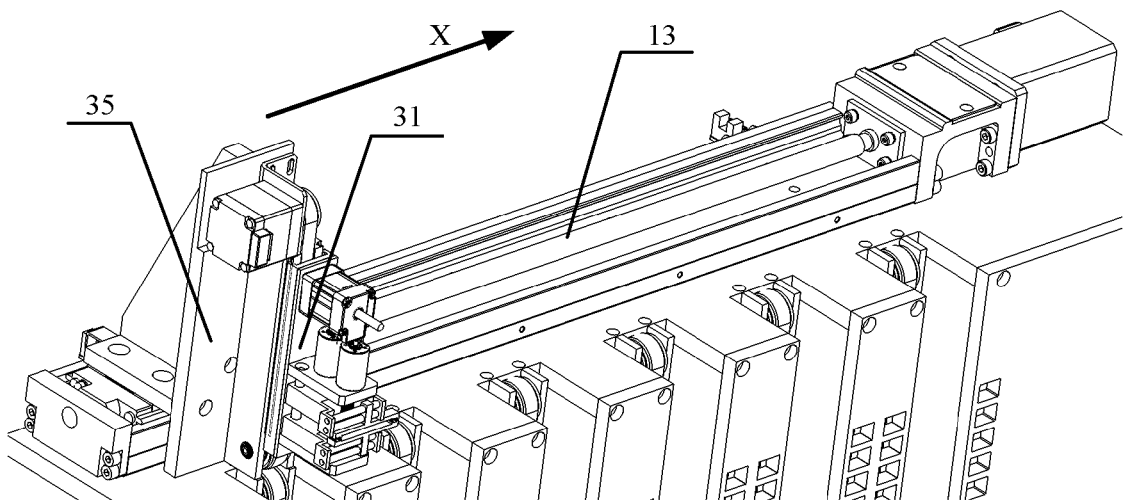
FIG. 11B is a schematic diagram of a column change state of an optical fiber distribution device according to an embodiment of the present disclosure.

FIG. 11B is a schematic diagram in which the column change robot 35 carries the insertion and removal robot 31.

(2) After the insertion and removal robot 31 removes the optical fiber connector and releases the optical fiber connector, the first fiber accommodating mechanism 32 needs to accommodate the optical fiber connector and the optical fiber in the connector retracting portion 2.

The following describes the first fiber accommodating mechanism 32.

Figure 12:
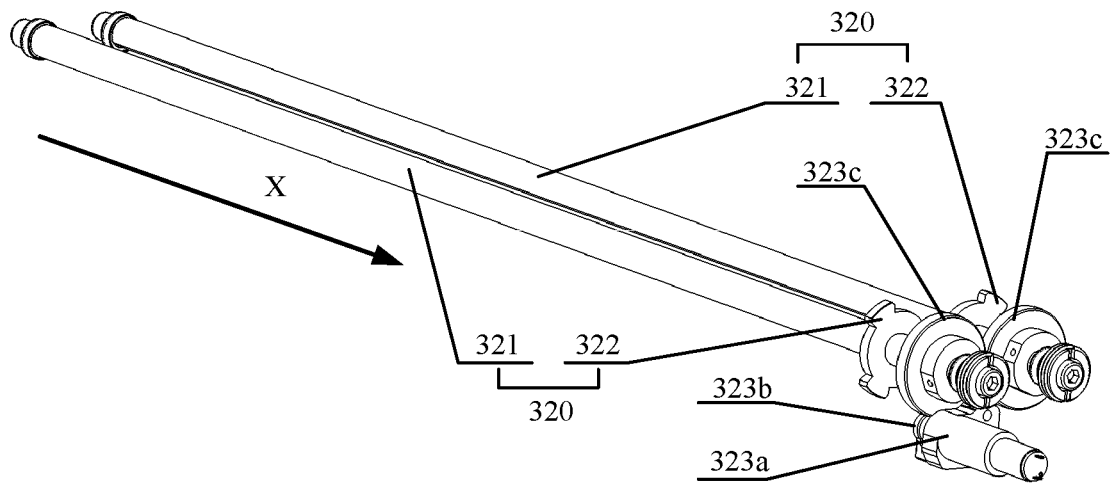
FIG. 12 is a schematic diagram of a first fiber accommodating mechanism according to an embodiment of the present disclosure.
Figure 13:
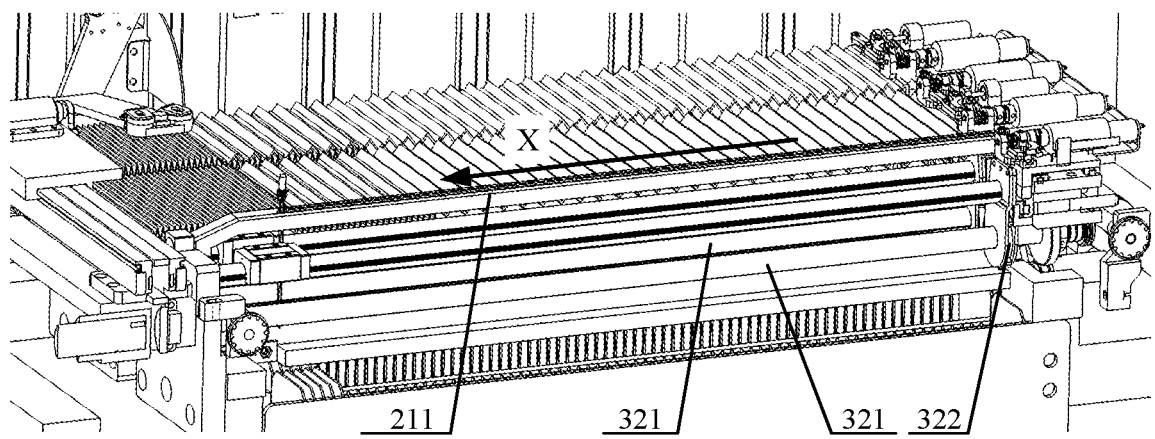
FIG. 13 is a schematic diagram of a location of a first fiber accommodating mechanism according to an embodiment of the present disclosure.

As shown in FIG. 12, the first fiber accommodating mechanism 32 includes two fiber accommodating units 320, and the two fiber accommodating units 320 are arranged opposite to each other. The fiber accommodating units 320 each include a rotating shaft 321 and a fiber accommodating wheel 322, an axis direction of the rotating shaft 321 is parallel to an arrangement direction of the connector accommodating holes 2111, the fiber accommodating wheel 322 is in key connection to the rotating shaft 321, and the fiber accommodating wheel 322 is movable in an axial direction of the rotating shaft 321. The fiber accommodating wheel 322 is provided with protrusion portions 3221 in a circumferential direction, and locations of the protrusion portions 3221 of the fiber accommodating wheel 322 of one fiber accommodating unit 320 correspond to locations of the protrusion portions 3221 of the fiber accommodating wheel 322 of the other fiber accommodating unit 320. In a fiber accommodating state of the first fiber accommodating mechanism 32, the two protrusion portions 3221 clamp the optical fiber connected to the optical fiber connector, and accommodate, through rotation, the optical fiber connected to the optical fiber connector.

A driving manner of the rotating shaft 322 is not specifically limited in the present disclosure. For example, as shown in FIG. 12, a driving apparatus of the rotating shaft includes a rotating shaft motor 323a, a rotating shaft driving gear 323b, and two rotating shaft driven gears 323c. The two rotating shaft driven gears 323c are respectively sleeved on the two rotating shafts 321 and are engaged with each other. The rotating shaft driving gear 323b is engaged with one of the rotating shaft driven gears 323c, and is fixedly connected to an output shaft of the rotating shaft motor 323a.

A principle in which the driving apparatus drives the rotating shaft 322 to rotate is as follows.

The output shaft of the rotating shaft motor 323a drives the rotating shaft driving gear 323b to rotate, the rotating shaft driving gear 323b drives one rotating shaft driven gear 323c engaged with the rotating shaft driving gear to rotate, and the rotating shaft driven gear 323c drives the other rotating shaft driven gear 323c to rotate. The two rotating shaft driven gears 323c respectively drive the two rotating shafts 321 to rotate. This driving manner can ensure synchronization of rotation of the two rotating shafts 322. The foregoing driving apparatus is merely an instance of this embodiment of the present disclosure, and does not constitute a limitation on the present disclosure. For example, the driving apparatus may alternatively include two driving motors, and output shafts of the two driving motors are fixedly connected to the two rotating shafts 321 respectively.

A driving manner in which the fiber accommodating wheel 322 moves in the axial direction of the rotating shaft 321 is not specifically limited in the present disclosure. For example, as shown in FIG. 14B, the clamp jaw robot 33 is provided with a clamping plate 336, and the clamping plate 336 includes two clamping sheets. The fiber accommodating wheel 322 is located between the two clamping sheets. In this way, when the clamp jaw robot 33 moves, the fiber accommodating wheel 322 is driven to slide along the rotating shaft 321. For a principle of movement of the clamp jaw robot 33, refer to a description part of the clamp jaw robot 33.

The first fiber accommodating mechanism 32 is located in the active fiber accommodating area 22 of the optical fiber distribution device. For a specific location, refer to FIG. 13. The first fiber accommodating mechanism 32 is located below the connector accommodating base 211.

Figure 14A:
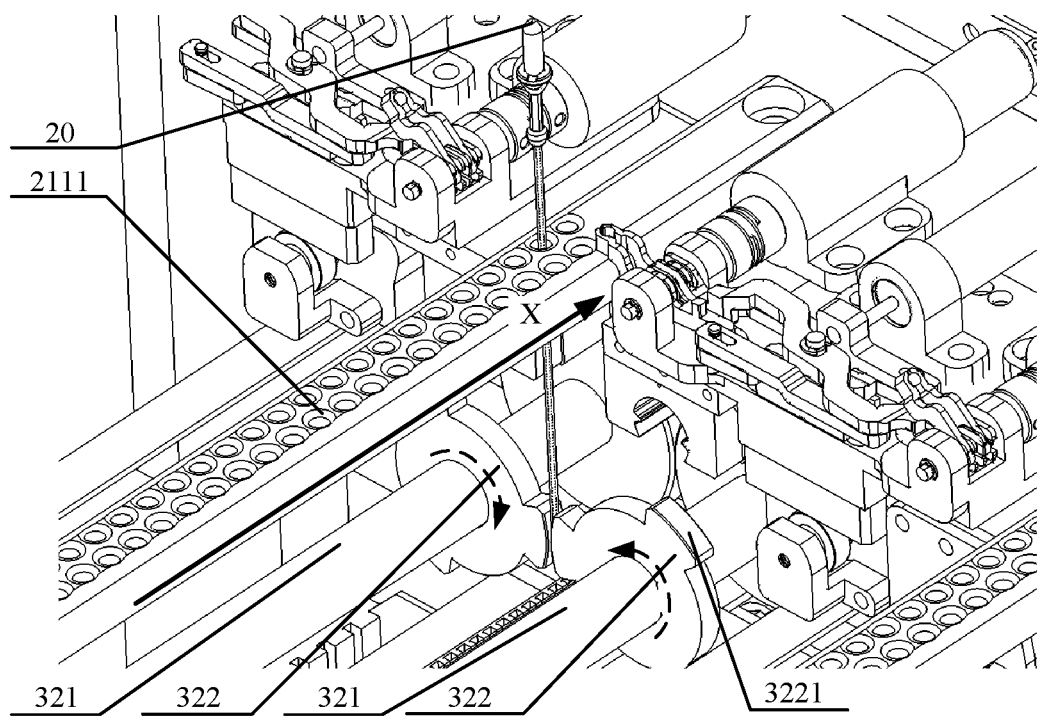
FIG. 14A is a schematic diagram of a fiber accommodating state of a first fiber accommodating mechanism according to an embodiment of the present disclosure.
Figure 14B:
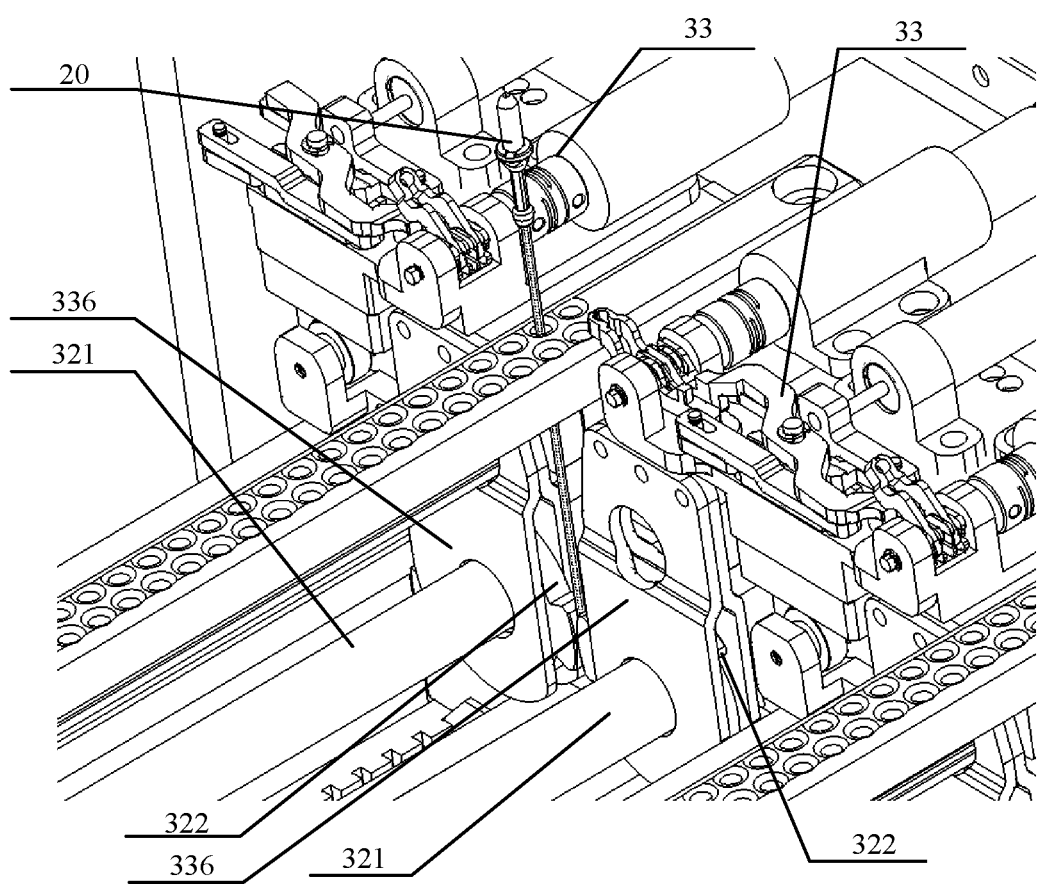
FIG. 14B is a schematic diagram of a fiber accommodating state of a first fiber accommodating mechanism according to an embodiment of the present disclosure.

With reference to FIG. 14A and FIG. 14B, the following describes a fiber accommodating principle of the first fiber accommodating mechanism 32. In FIG. 14A, the clamping plate 336 configured to drive the fiber accommodating wheel 322 to move in an axial direction is hidden, and in FIG. 14B, the clamping plate 336 configured to drive the fiber accommodating wheel 322 to move in the axial direction is shown.

As shown in FIG. 14A, in a fiber accommodating state of the first fiber accommodating mechanism 322, the protrusion portions 3221 of the two fiber accommodating wheels 322 clamp the optical fiber, and rotate relative to each other in a direction of an arrow shown in the figure, so that the two fiber accommodating wheels 322 drive, through friction, the optical fiber to be gradually accommodated into the fiber storage area 23. In addition, the optical fiber connector is also gradually accommodated into the connector parking area 21 along with the optical fiber.

(3) After the first fiber accommodating mechanism 32 accommodates the optical fiber and the optical fiber connector into the connector retracting portion 2, the clamp jaw robot 33 needs to take out the optical fiber connector and transfer the optical fiber connector to the insertion and removal robot 31.

The following describes the clamp jaw robot 33 and related components.

Figure 15A:
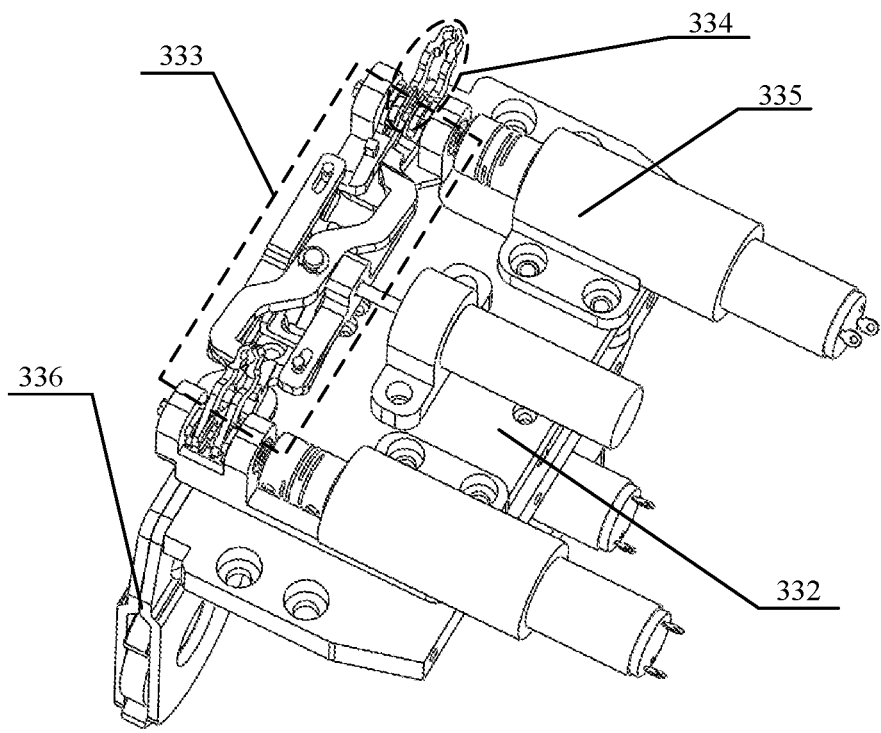
FIG. 15A is a schematic diagram of a clamp jaw robot according to an embodiment of the present disclosure.
Figure 15B:
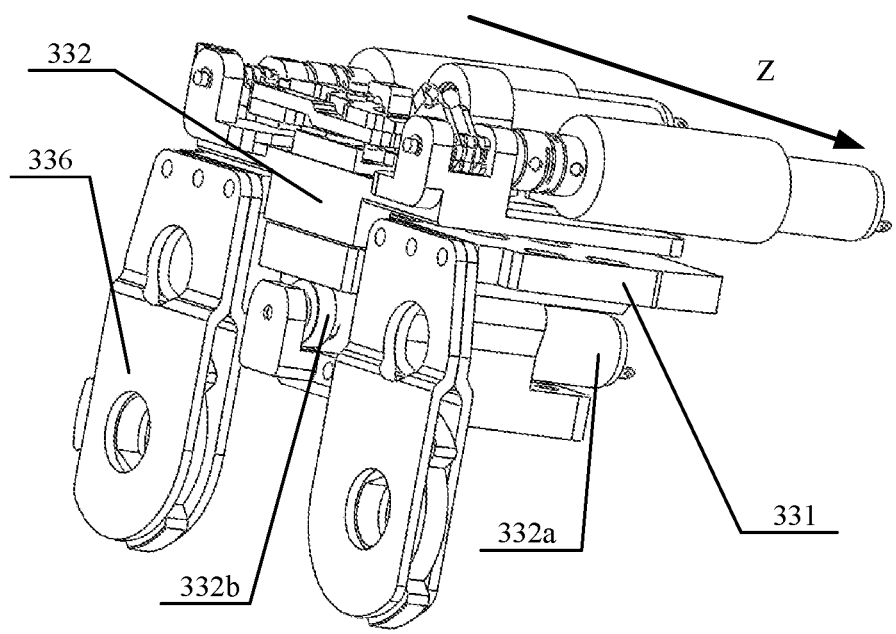
FIG. 15B is a schematic diagram of a clamp jaw robot according to an embodiment of the present disclosure.

As shown in FIG. 15A and FIG. 15B, the clamp jaw robot 33 includes a clamp jaw robot base 331, a transverse movable base 332, a clamping mechanism 333, a clamp jaw pair 334, and a clamp jaw rotation driving apparatus 335. The transverse movable base 332 is slidably connected to the clamp jaw robot base 331, and a sliding direction is perpendicular to an arrangement direction of connector accommodating holes 2111. The clamp jaw rotation driving apparatus 335 is fixed on the transverse movable base 332, and the clamp jaw pair 334 is sleeved on a rotating shaft of the clamp jaw rotation driving apparatus 335. The clamping mechanism 333 is located on the transverse movable base 332 and is configured to tighten or loosen the clamp jaw pair 334.

The clamp jaw pair 334 can implement a clamping action, a loosening action, and a removal action on the optical fiber connector. The clamping mechanism 333 can implement clamping and loosening actions of the clamp jaw pair 334 on the optical fiber connector by clamping or loosening the clamp jaw pair 334. The clamp jaw rotation driving apparatus 335 can drive the clamp jaw pair 334 to rotate to implement the removal action on the optical fiber connector. After the clamp jaw pair 334 clamps the optical fiber connector, the clamp jaw rotation driving apparatus 335 can remove the optical fiber connector from the connector accommodating hole 2111 by driving the clamp jaw pair 334 to rotate.

In addition, to enable the clamp jaw robot 33 to avoid the optical fiber connector, the clamping mechanism 333, the clamp jaw pair 334, and the clamp jaw rotation driving apparatus 335 may be all fixed on the transverse movable base 332, the transverse movable base 332 is slidably connected to the clamp jaw robot base 331, and a sliding direction (the z direction shown in FIG. 15B) is perpendicular to the arrangement direction of the connector accommodating holes 2111. In this way, the clamp jaw pair 334 can move closer to the optical fiber connector or away from the optical fiber connector.

A driving manner of the transverse movable base 332 is not specifically limited in the present disclosure. For example, as shown in FIG. 15B, a driving apparatus of the transverse movable base 332 includes a transverse movable base driving motor 332a and a transverse movable base driving gear 332b. The transverse movable base driving gear 332b is fixedly connected to a rotating shaft of the transverse movable base driving motor 332a, and is engaged with the transverse movable base 332 (the transverse movable base 332 is provided with a rack structure). When the transverse movable base 332 is driven to move horizontally, an output shaft of the transverse movable base driving motor 332a drives the transverse movable base driving gear 332b to rotate, and then the transverse movable base driving gear 332b drives the transverse movable base 332 to perform linear movement.

There may be a plurality of implementations of the clamping mechanism 333, and the following provides a possible implementation.

Figure 16:
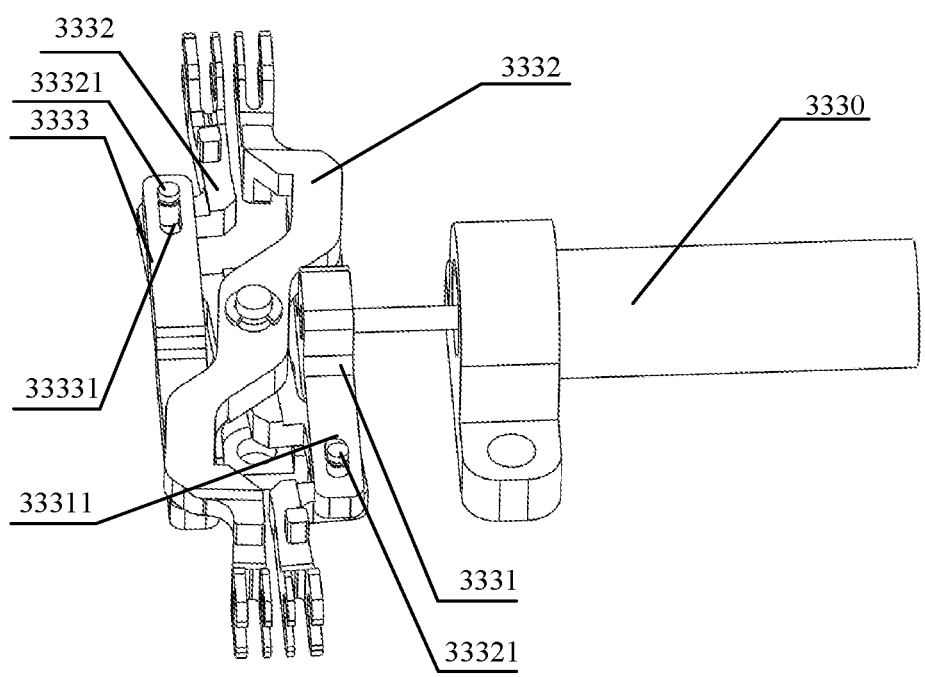
FIG. 16 is a schematic diagram of a clamping mechanism according to an embodiment of the present disclosure.

As shown in FIG. 16, the clamping mechanism 333 includes a clamping driving apparatus 3330, a driving connecting rod 3331, and two clamping arms 3332. Middle parts of the two clamping arms 3332 are hinged and a hinged point is fixed, the clamping arms 3332 are provided with connection protrusions 33321, two ends of the driving connecting rod 3331 are provided with connection holes 33311, the connection protrusions 33321 of the two clamping arms 3332 are respectively located in the connection holes 33311 at the two ends of the driving connecting rod 3331, and the connection protrusions 33321 are slidable in the connection holes 33311. Each clamping end of the two clamping arms 3332 clamps one clamp jaw of the clamp jaw pair 334. A push rod of the clamping driving apparatus 3330 is fixedly connected to the driving connecting rod 3331, and the push rod is perpendicular to the driving connecting rod 3331.

Clamping and loosening principles of the clamping mechanism 333 are as follows.

During clamping, the push rod of the clamping driving apparatus 3330 extends outward and drives the driving connecting rod 3331 to move, so that the two clamping arms 3332 move toward each other under pushing of the driving connecting rod 3331, and the two clamping arms 3332 drive the clamp jaw pair 334 to implement a clamping action. During loosening, the push rod of the clamping driving apparatus 3330 retracts inward and drives the driving connecting rod 3331 to move, so that the two clamping arms 3332 move away from each other under driving of the driving connecting rod 3331, and the two clamping arms 3332 drive the clamp jaw pair 334 to implement a loosening action.

In addition, to make the clamping mechanism 333 more stable, as shown in FIG. 16, the clamping mechanism 333 may further include a follow-up connecting rod 3333. Each clamping arm 3332 is provided with two connection protrusions 33321, and the other two connection protrusions 33321 of the two clamping arms 3332 are located in two follow-up connection holes 33331 of the follow-up connecting rod 3333.

To enable the clamp jaw robot 33 to be responsible for inserting and removing more optical fiber connectors, the clamp jaw robot 33 may move in the connector parking area 21. The following provides a possible implementation of the clamp jaw robot 33.

Figure 17:
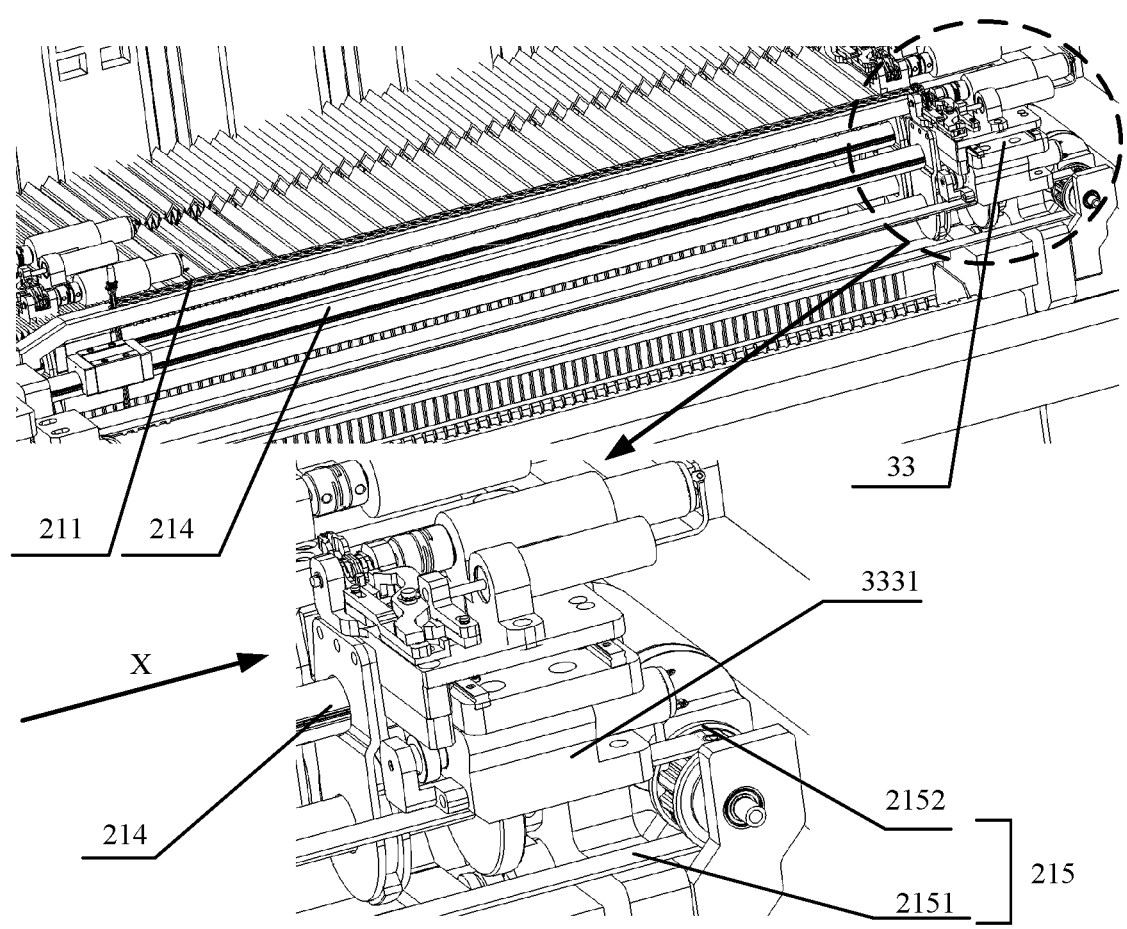
FIG. 17 is a schematic diagram of a driving mechanism of a clamp jaw robot according to an embodiment of the present disclosure.

As shown in FIG. 17, the connector parking area 21 is provided with a clamp jaw robot guide rail 214 and a clamp jaw robot synchronous belt assembly 215. An axis direction of the clamp jaw robot guide rail 214 and a movement direction of the clamp jaw robot synchronous belt assembly 215 are parallel to an arrangement direction (the x direction) of connector accommodating holes 2111. The clamp jaw robot base 331 matches the clamp jaw robot guide rail 214, and is fixedly connected to the clamp jaw robot synchronous belt assembly 215.

The clamp jaw robot guide rail 214 matches the clamp jaw robot base 331 of the clamp jaw robot 33 to form a linear motion pair. The clamp jaw robot guide rail 214 can limit the clamp jaw robot base 331, so that the clamp jaw robot 33 can move along only the clamp jaw robot guide rail 214 and is not separated from the clamp jaw robot guide rail 214. Power for the clamp jaw robot 33 to move may be provided by the clamp jaw robot synchronous belt assembly 215.

The clamp jaw robot synchronous belt assembly 215 includes a clamp jaw robot synchronous belt 2151 and a clamp jaw robot rotating wheel 2152. Synchronous teeth are disposed on both an outer wall of the clamp jaw robot rotating wheel 2152 and an inner side of the clamp jaw robot synchronous belt 2151 and are engaged with each other, so that the clamp jaw robot rotating wheel 2152 can drive the clamp jaw robot synchronous belt 2151 to rotate. In addition, an outer side of the clamp jaw robot synchronous belt 2151 may be fixedly connected to the clamp jaw robot base 331, and the clamp jaw robot synchronous belt 2151 can drive the clamp jaw robot 33 to move. In another possible implementation, the outer side of the clamp jaw robot synchronous belt 2151 may further be engaged with the clamp jaw robot base 331.

As shown in FIG. 15B, the clamp jaw robot 33 further includes the clamping plate 336, the clamping plate 336 corresponds to a location of the clamp jaw pair 334 in a vertical direction (the y direction), and the clamping plate 336 is fixedly connected to the clamp jaw robot base 331. The clamping plate 336 clamps the fiber accommodating wheel 322 in the first fiber accommodating mechanism 32, so that when the clamp jaw robot 33 moves, the clamping plate 336 can drive the fiber accommodating wheel 322 to move.

Because the clamping plate 336 corresponds to the location of the clamp jaw pair 334 in the vertical direction (the y direction), when the first fiber accommodating mechanism 32 accommodates the optical fiber connector into the connector accommodating hole 2111, the clamp jaw robot 33 does not need to move, and can directly clamp the optical fiber connector by using the clamp jaw pair 334.

In a possible implementation, the clamp jaw robot 33 may directly transfer the removed optical fiber connector to the insertion and removal robot 31.

In another possible implementation, the clamp jaw robot 33 may indirectly transfer the removed optical fiber connector to the insertion and removal robot 31, for example, the removed optical fiber connector may be transferred by using the transit robot 34. In this case, the robot system 3 further includes a transit robot 34. The transit robot 34 is located in a junctional area between the distribution portion 1 and the connector parking area 21 (for example, may be located on the distribution portion 1 or located in the connector parking area 21, which is not specifically limited in the present disclosure), and is configured to transfer a connector carried by the clamp jaw robot 33 to the insertion and removal robot 31.

Figure 18A:
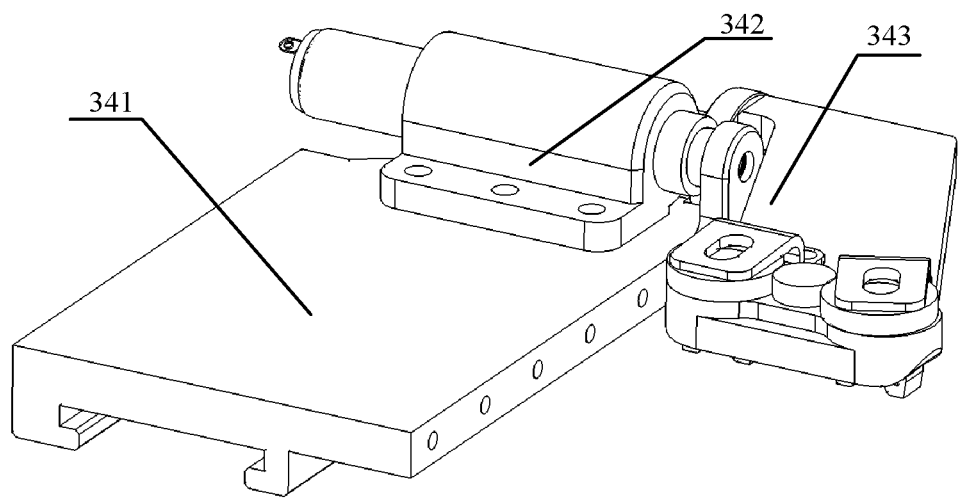
FIG. 18A is a schematic diagram of a transit mechanism according to an embodiment of the present disclosure.
Figure 18B:
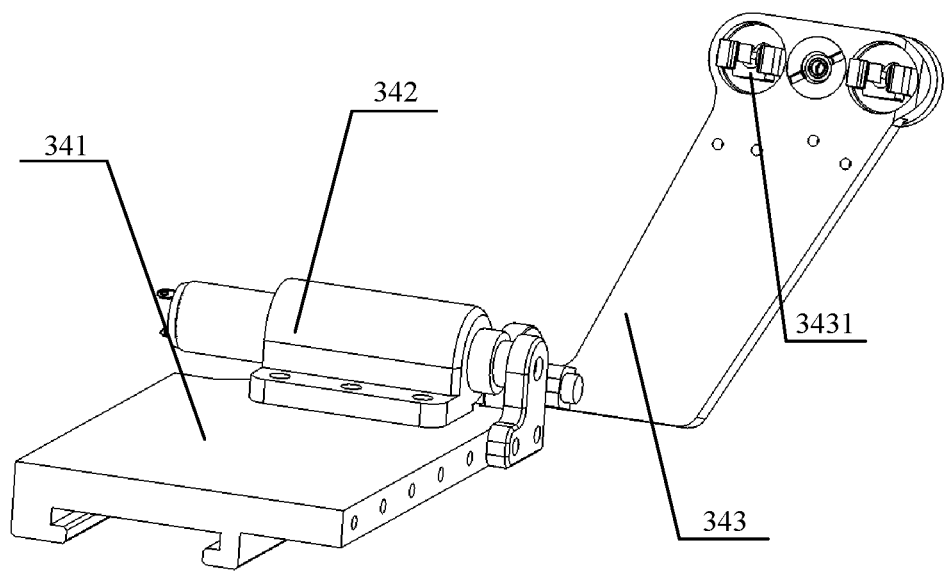
FIG. 18B is a schematic diagram of a transit mechanism according to an embodiment of the present disclosure.

As shown in FIG. 18A and FIG. 18B, the transit robot 34 includes a transit robot base 341, an overturning driving apparatus 342, and an overturning plate 343. The overturning driving apparatus 342 is fixed on the transit robot base 341, and the overturning driving apparatus 342 is in transmission connection to the overturning plate 343. A surface of the overturning plate 343 close to the connector retracting portion 2 is provided with a connector carrying hole 3431, and the connector carrying hole 3431 is fitted with the optical fiber connector.

Figure 18C:
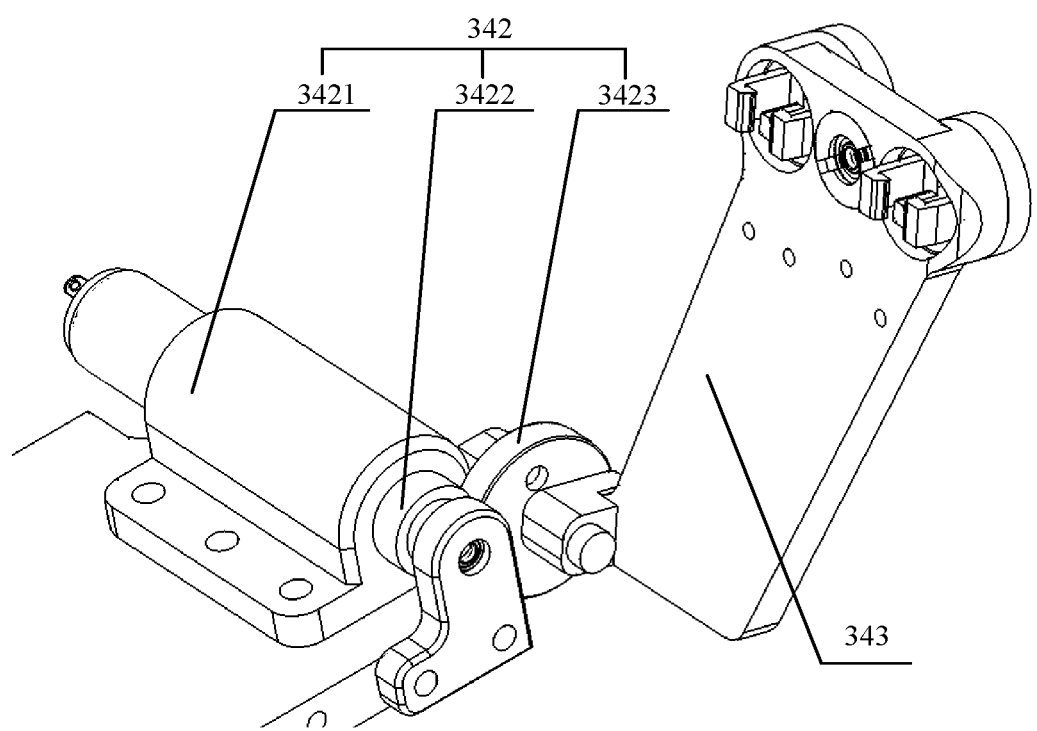
FIG. 18C is a schematic diagram of a transit mechanism according to an embodiment of the present disclosure.

As shown in FIG. 18C, the overturning driving apparatus 342 includes an overturning driving motor 3421, an overturning driving gear 3422, and an overturning driven gear 3423. The overturning driving gear 3422 is sleeved on an output shaft of the overturning driving motor 3421, the overturning driving gear 3422 is engaged with the overturning driven gear 3423, and one side of the overturning plate 343 is fixedly connected to the overturning driven gear 3423. In this case, the overturning driving motor 3421 drives, by using the overturning driving gear 3422, the overturning driven gear 3423 to rotate, and the overturning plate 343 rotates with the overturning driven gear 3423, to overturn the overturning plate 343.

The overturning plate 343 has a first overturning state (as shown in FIG. 18A) and a second overturning state (as shown in FIG. 18B).

In the first overturning state, the overturning plate 343 is in a horizontal state or an approximately horizontal state and is configured to receive the optical fiber connector carried by the clamp jaw robot 33. For example, the clamp jaw robot 33 clamps the optical fiber connector by using the clamp jaw pair 334, and inserts the optical fiber connector into the connector carrying hole 3431 through rotation.

In the second overturning state, the overturning plate 343 is in a vertical state or an approximately vertical state and is configured for the insertion and removal robot 31 to remove the optical fiber connector from the connector carrying hole 3431.

In a possible implementation, the transit robot base 341 may be fixed to the connector parking area 21. A length of the overturning plate 343 is long, so that the overturning plate can cover a location of a plurality of columns of clamp jaw robots 31.

Figure 19:
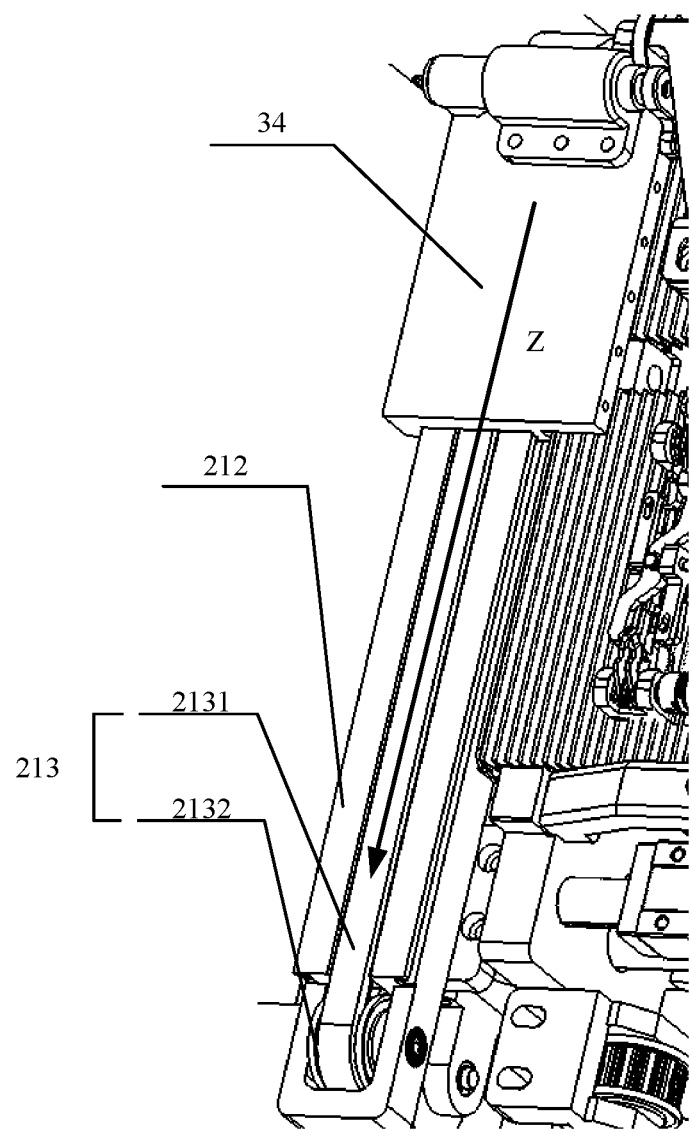
FIG. 19 is a schematic diagram of a driving mechanism of a transit mechanism according to an embodiment of the present disclosure.

In another possible implementation, the transit robot 34 may further move in the connector parking area 21. As shown in FIG. 19, the connector parking area 21 is provided with a transit robot track 212 and a transit robot synchronous belt assembly 213. An axis direction of the transit robot track 212 is perpendicular to an arrangement direction (that is, the z direction in FIG. 19) of connector accommodating holes 2111, the transit robot track is located on one side of the connector parking area 21, and the transit robot synchronous belt assembly 213 is located inside the transit robot track 212. The transit robot base 341 matches the transit robot track 212, and is fixedly connected to the transit robot synchronous belt assembly 213.

The transit robot track 212 matches the insertion and removal robot base 311 of the transit robot 34 to form a linear motion pair. The transit robot track 212 can limit the insertion and removal robot base 311, so that the transit robot 34 can move along only the transit robot track 212 and is not separated from the transit robot track 212. Power for the transit robot 34 to move may be provided by the transit robot synchronous belt assembly 213.

The transit robot synchronous belt assembly 213 includes a transit robot synchronous belt 2131 and a transit robot rotating wheel 2132. Synchronous teeth are disposed on both an outer wall of the transit robot rotating wheel 2132 and an inner side of the transit robot synchronous belt 2131 and are engaged with each other, so that the transit robot rotating wheel 2132 can drive the transit robot synchronous belt 2131 to rotate. In addition, an outer side of the transit robot synchronous belt 2131 may be fixedly connected to the transit robot base 314, and the transit robot synchronous belt 2131 can drive the transit robot 34 to move. In another possible implementation, the outer side of the transit robot synchronous belt 2131 may further be engaged with the transit robot base 314.

(4) After receiving a target optical fiber connector, the insertion and removal robot 31 may insert the optical fiber connector into a target optical fiber adapter. For content of this part, refer to related description in (1), and details are not described herein again.

Based on the foregoing, with reference to the optical fiber distribution device shown in FIG. 1 to FIG. 19, An optical fiber scheduling process is described completely.

First step: A controller in an optical fiber scheduling device receives an instruction for inserting a target optical fiber connector into a target optical fiber adapter.

Second step: The controller obtains, based on connected optical fibers of pre-stored optical fiber connectors, a location of an initial optical fiber adapter into which the target optical fiber connector is inserted. In this case, a location of the target optical fiber adapter may further be obtained.

Third step: The controller controls the insertion and removal robot synchronous belt assembly 12, the column change robot 35, and the lead screw mechanism 13 to move the insertion and removal robot 31 to near the initial optical fiber adapter.

Fourth step: Control the insertion and removal robot 31 to remove the target optical fiber connector from the initial optical fiber adapter, and release the target optical fiber connector.

Fifth step: Control the clamp jaw robot 33 to move the fiber accommodating mechanism 32 to near the optical fiber accommodating hole 2111 corresponding to the target optical fiber connector.

Sixth step: Control the first fiber accommodating mechanism 32 to gradually accommodate the target optical fiber connector in the optical fiber accommodating hole 2111. In this process, it may further be detected in real time whether accommodating is completed.

Seventh step: Control the clamp jaw robot 33 to clamp the target optical fiber connector.

Eighth step: Control the clamp jaw robot synchronous belt assembly 215 to move the clamp jaw robot 33 to near the transit robot 34.

Ninth step: Control the clamp jaw robot 33 to insert the target optical fiber connector into the connector carrying hole 3431 of the transit robot 34.

Tenth step: Control the transit robot 34 to overturn the overturning plate 343 into a vertical state.

Eleventh step: Control the insertion and removal robot 31 to clamp the target optical fiber connector from the transit robot 34.

Twelfth step: Control the insertion and removal robot synchronous belt assembly 12, the column change robot 35, and the lead screw mechanism 13 to move the insertion and removal robot 31 to near the target optical fiber adapter.

Thirteenth step: Control the insertion and removal robot 31 to insert the target optical fiber connector into the target optical fiber adapter.

The following describes another optical fiber distribution device provided in an embodiment of the present disclosure with reference to FIG. 20 to FIG. 22C.

As shown in FIG. 20, a distribution portion 1 and a connector retracting panel (that is, a connector parking area 21) of the optical fiber distribution device are disposed opposite to each other.

Figure 21:
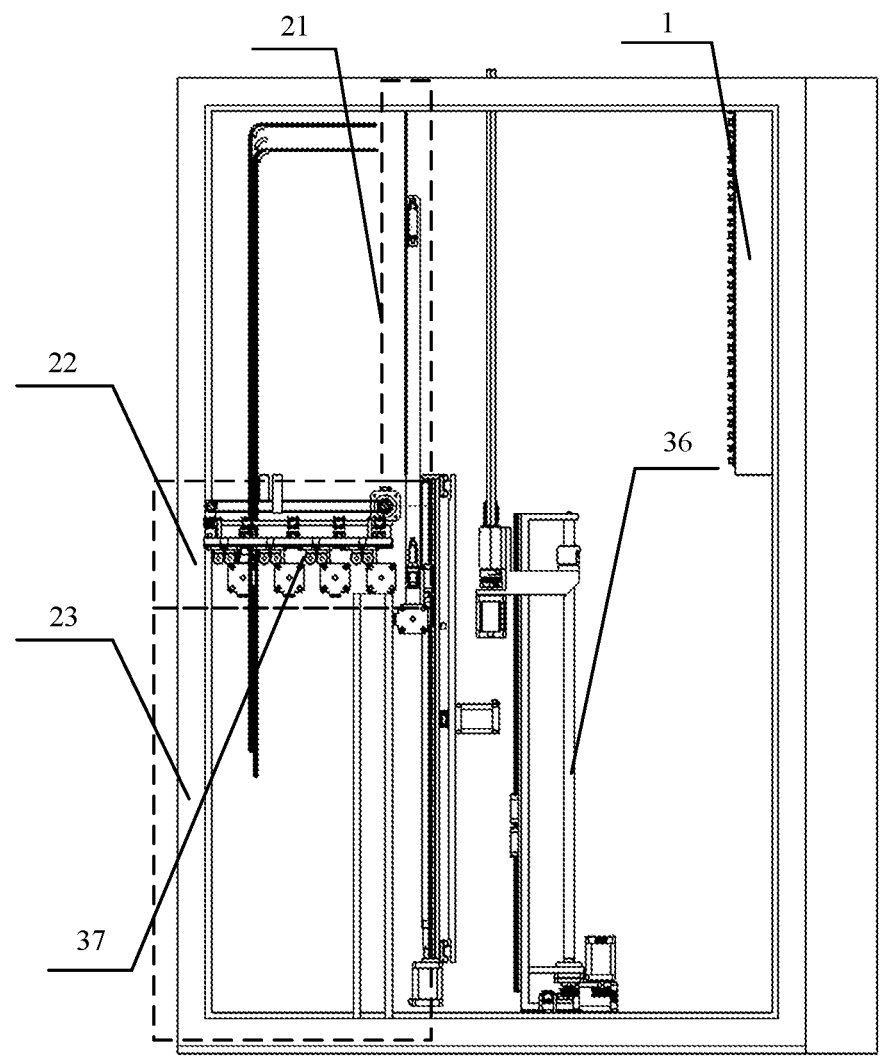
FIG. 21 is a schematic diagram of an optical fiber distribution device according to an embodiment of the present disclosure.

As shown in FIG. 21, a connector retracting portion 2 may be divided into three areas, which are respectively a connector parking area 21, an active fiber accommodating area 22, and a fiber storage area 23 in a direction of an optical fiber, and the connector parking area 21 is close to an optical fiber connector.

The connector parking area 21 is used to park an optical fiber connector, and the connector parking area 21 is provided with a plurality of connector accommodating holes. Each connector accommodating hole is configured to accommodate an optical fiber connector, and an optical fiber connected to the optical fiber connector passes through the connector accommodating hole. In a possible implementation, to facilitate accommodating the optical fiber connector, the connector accommodating hole may be a stepped hole, and the optical fiber connector may be parked on a stepped base of the stepped hole.

The active fiber accommodating area 22 is provided with a mechanism that can accommodate an optical fiber. A fiber accommodating principle of the mechanism may be that an optical fiber connector is accommodated in the connector parking area 21 by dragging an optical fiber of the optical fiber connector, and the optical fiber is accommodated in the fiber storage area 23.

The fiber storage area 23 is used to store the optical fiber connected to the optical fiber connector. To prevent the stored optical fiber from being wound, the fiber storage area 23 may be provided with a plurality of fiber storage cavities that are spaced apart from each other, and each fiber storage cavity is configured to accommodate one optical fiber. In addition, the plurality of fiber storage cavities one-to-one correspond to the plurality of connector accommodating holes.

As shown in FIG. 20, the robot system 3 includes a distribution robot 36, and a second fiber accommodating mechanism 37. The distribution robot 36 is located between the distribution portion 1 and the connector retracting portion 2, and is configured to insert and remove an optical fiber connector into and from an optical fiber adapter, and take out the optical fiber connector from the connector retracting portion 2. The second fiber accommodating mechanism 37 is located on the connector retracting portion 2, and is configured to retract the optical fiber connector and the optical fiber connected to the optical fiber connector to the connector retracting portion 2.

The following describes in detail the distribution robot 36 and the second fiber accommodating mechanism 37 according to a working sequence of the robots in the optical fiber scheduling process.

(1) First, the distribution robot 36 needs to remove a target optical fiber connector from an initial optical fiber adapter and release the target optical fiber connector.

Figure 22A:
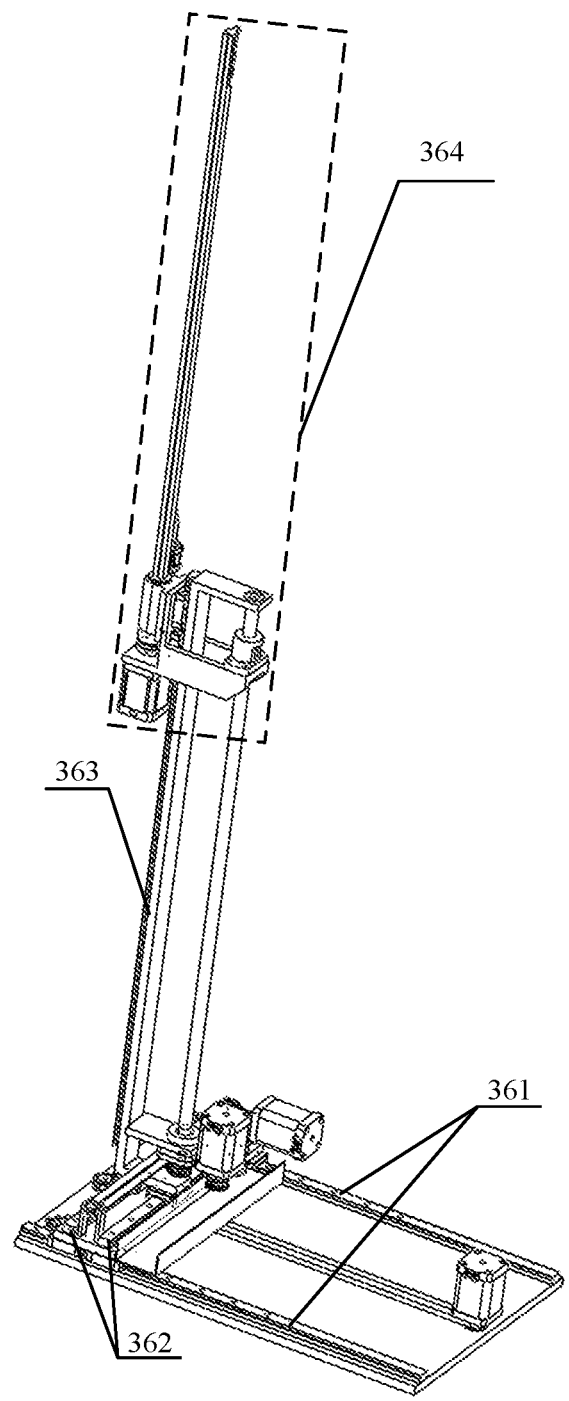
FIG. 22A is a schematic diagram of a distribution robot according to an embodiment of the present disclosure.

As shown in FIG. 22A, the distribution robot 36 includes a first guide rail 361, a second guide rail 362, a third guide rail 363, and a clamping mechanism 364. The first guide rail 361 is fixed at the bottom of the optical fiber distribution device, the second guide rail 362 is slidably connected to the first guide rail 361, the third guide rail 363 is fixed on the second guide rail 362, and axis directions of the first guide rail 361, the second guide rail 362, and the third guide rail 363 are perpendicular to each other. The clamping mechanism 364 is slidably connected to the third guide rail 363, and is configured to clamp and loosen the optical fiber connector.

The following describes a driving manner of movement of the clamping mechanism 364 along the first guide rail 361, the second guide rail 362, and the third guide rail 363.

Figure 22B:
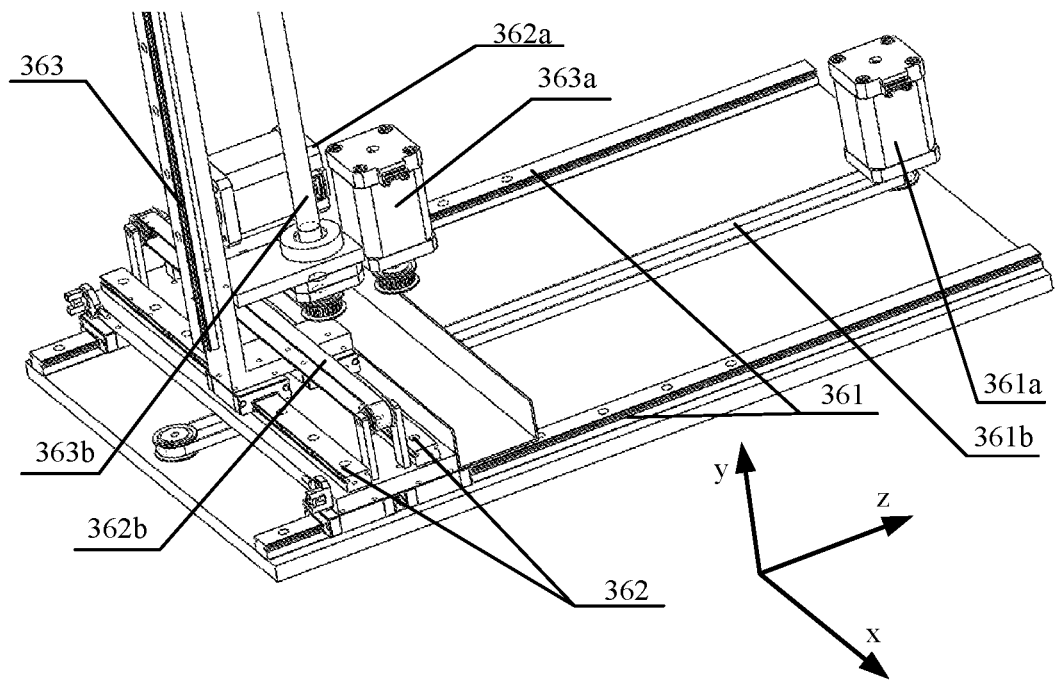
FIG. 22B is a schematic diagram of a distribution robot according to an embodiment of the present disclosure.

As shown in FIG. 22B, the second guide rail 362, the third guide rail 363, and the clamping mechanism 364 are all located on the first guide rail 361. An arrangement direction of the first guide rail 361 is a z direction. By moving along the first guide rail 361, the clamping mechanism 364 may move between the distribution portion 1 and the connector parking area 21. A driving apparatus includes a first motor 361*a* and a first synchronous belt 361*b*. The first motor 361*a* drives the first synchronous belt 361*b* to rotate, and the first synchronous belt 361*b* is in transmission connection (for example, fixedly connected or engaged) to the second guide rail 362. In this case, the first motor 361*a* can drive the second guide rail 362 to move along the first guide rail 361, and the third guide rail 363 and the clamping mechanism 364 are located on the second guide rail 362 and move along the second guide rail 362.

The third guide rail 363 and the clamping mechanism 364 are located on the second guide rail 362, and an arrangement direction of the second guide rail 362 is an x direction. By moving along the second guide rail 362, the third guide rail and the clamping mechanism may move toward the target optical fiber connector in the x direction. A driving apparatus includes a second motor 362*a* and a second synchronous belt 362*b*. The second motor 362*a* drives the second synchronous belt 362*b* to rotate, and the second synchronous belt 362*b* is in transmission connection (for example, fixedly connected or engaged) to the third guide rail 363. In this case, the second motor 362*a* can drive the third guide rail 363 to move along the second guide rail 362, and the clamping mechanism 364 moves along the third guide rail 363.

The clamping mechanism 364 is located on the third guide rail 363, and an arrangement direction of the third guide rail 363 is a y direction. By moving along the third guide rail 363, the clamping mechanism may move toward the target optical fiber connector in the y direction and avoid the optical fiber. A driving apparatus may include a third motor 363*a* and a third lead screw 363*b*. The third motor 363*a* is in transmission connection to the third lead screw 363*b*, and the clamping mechanism 364 matches the third lead screw 363*b* (the clamping mechanism 364 is provided with a nut structure). In this case, the third motor 363*a* drives the third lead screw 363*b* to rotate, and the clamping mechanism 364 moves along the third guide rail 363.

It can be learned that the distribution robot 36 provided in this embodiment of the present disclosure actually has a structure of a three-axis robot, and can move in the x direction, the y direction, and the z direction. By moving in the z direction, the distribution robot 36 may move to the distribution portion 1 and the connector parking area 21, and perform location switching between the distribution portion and the connector parking area. By moving in the x direction and the z direction, the distribution robot 36 may move to the target connector, and may avoid the optical fiber by moving in the y direction.

The clamping mechanism 364 may have a plurality of possible implementations. This is not specifically limited in this embodiment of the present disclosure. The following provides a possible implementation.

Figure 22C:
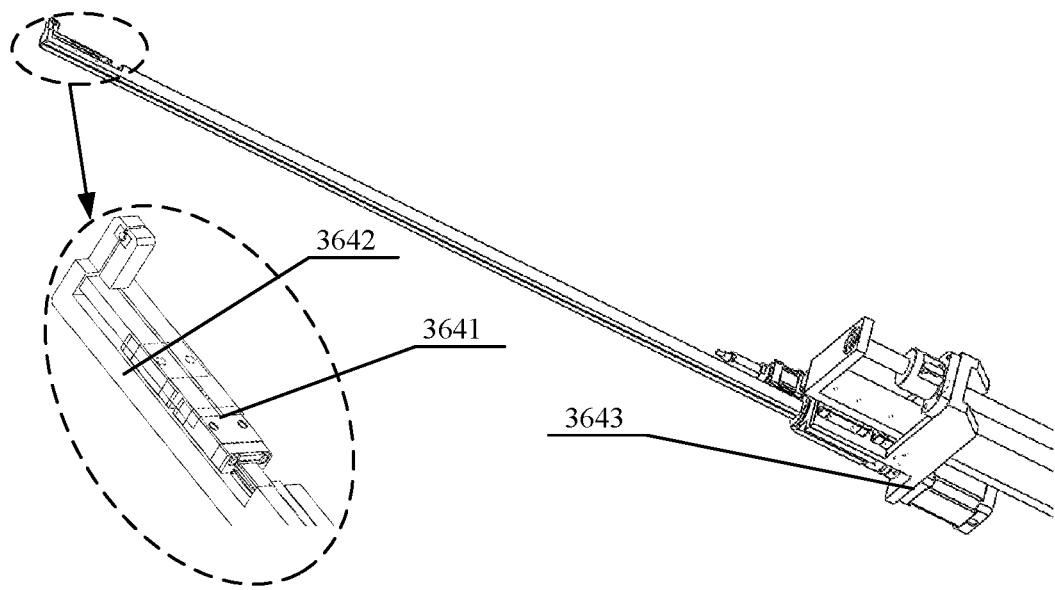
FIG. 22C is a schematic diagram of a distribution robot according to an embodiment of the present disclosure.

As shown in FIG. 22C, the clamping mechanism 364 includes a first clamping arm 3641, a second clamping arm 3642, and a clamping driving apparatus 3643. The first clamping arm 3641 is slidably connected to the second clamping arm 3642. The clamping driving apparatus 3643 is in transmission connection to the first clamping arm 3641, and is configured to drive a clamping end of the first clamping arm 3641 to move away from or closer to a clamping end of the second clamping arm 3642.

The clamping driving apparatus 3643 may implement a clamping action and a loosening action of the first clamping arm 3641 and the second clamping arm 3642 by pushing the first clamping arm 3641.

(2) After the distribution robot 36 removes the optical fiber connector and releases the optical fiber connector, the second fiber accommodating mechanism 37 needs to accommodate the optical fiber connector and an optical fiber in the connector retracting portion 2.

For related description of the second fiber accommodating mechanism 37 provided in this embodiment of the present disclosure, refer to the related description of the first fiber accommodating mechanism 32. Fiber accommodating principles of the second fiber accommodating mechanism and the first fiber accommodating mechanism are the same.

Figure 23:
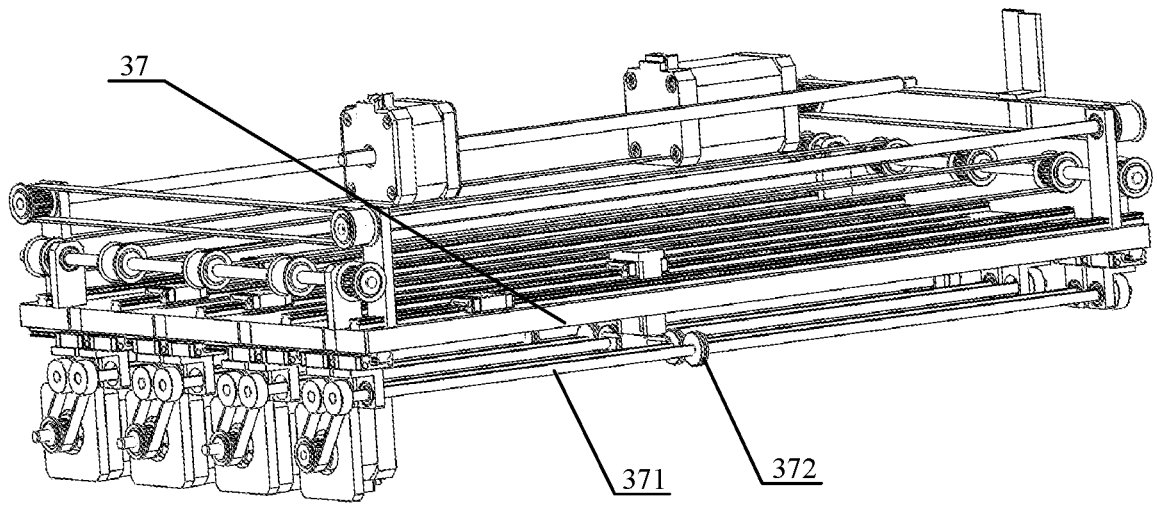
FIG. 23 is a schematic diagram of a second fiber accommodating mechanism according to an embodiment of the present disclosure.

Referring to FIG. 23, the second fiber accommodating mechanism 37 also includes two fiber accommodating units, and the two fiber accommodating units are arranged opposite to each other. The fiber accommodating units each include a second rotating shaft 371 and a second fiber accommodating wheel 372, an axis direction of the second rotating shaft 371 is parallel to an arrangement direction of the connector accommodating holes, the second fiber accommodating wheel 372 is in key connection to the second rotating shaft 371, and the second fiber accommodating wheel 372 is movable in an axial direction of the second rotating shaft 371. The second fiber accommodating wheel 372 is provided with protrusion portions in a circumferential direction, and locations of the protrusion portions of the second fiber accommodating wheel 372 of one fiber accommodating unit correspond to locations of the protrusion portions of the second fiber accommodating wheel 372 of the other fiber accommodating unit. In a fiber accommodating state of the second fiber accommodating mechanism 37, the two protrusion portions clamp the optical fiber connected to the optical fiber connector, and accommodate, through rotation, the optical fiber connected to the optical fiber connector.

It should be noted that the second fiber accommodating wheel 372 in the second fiber accommodating mechanism 37 needs to be equipped with a dedicated driving apparatus, and the driving apparatus may drive the second fiber accommodating wheel 372 to move axially along the second rotating shaft 371. The driving apparatus may be similar to the clamp jaw robot 33, and both are driven by a synchronous belt.

(3) After the second fiber accommodating mechanism 37 accommodates the optical fiber and the optical fiber connector in the connector retracting portion 2, the distribution robot 36 needs to take out the optical fiber connector and insert the optical fiber connector into a target optical fiber adapter. For this process, refer to the related description in (1), and details are not described herein again.

Based on the foregoing, with reference to the optical fiber distribution device shown in FIG. 20 to FIG. 22C, an optical fiber scheduling process is described completely.

First step: A controller in an optical fiber scheduling device receives an instruction for inserting a target optical fiber connector into a target optical fiber adapter.

Second step: The controller obtains, based on connected optical fibers of pre-stored optical fiber connectors, a location of an initial optical fiber adapter into which the target optical fiber connector is inserted. In this case, a location of the target optical fiber adapter may further be obtained.

Third step: The controller controls the distribution robot 36 to move to near the initial optical fiber adapter, and take out and release the target optical fiber connector.

Fourth step: The controller controls the second fiber accommodating mechanism 37 to gradually accommodate the target optical fiber connector in the optical fiber accommodating hole. In this process, it may further be detected in real time whether accommodating is completed.

Fifth step: The controller controls the distribution robot 36 to move from the distribution portion 1 to the connector retracting portion 2, move to near the optical fiber accommodating hole corresponding to the target optical fiber connector, and clamp the target optical fiber connector. The distribution robot carries the target optical fiber connector and moves from the connector retracting portion 2 to the distribution portion 1, moves to near the target optical fiber adapter, and inserts the target optical fiber connector into the target optical fiber adapter.

Figure 24:
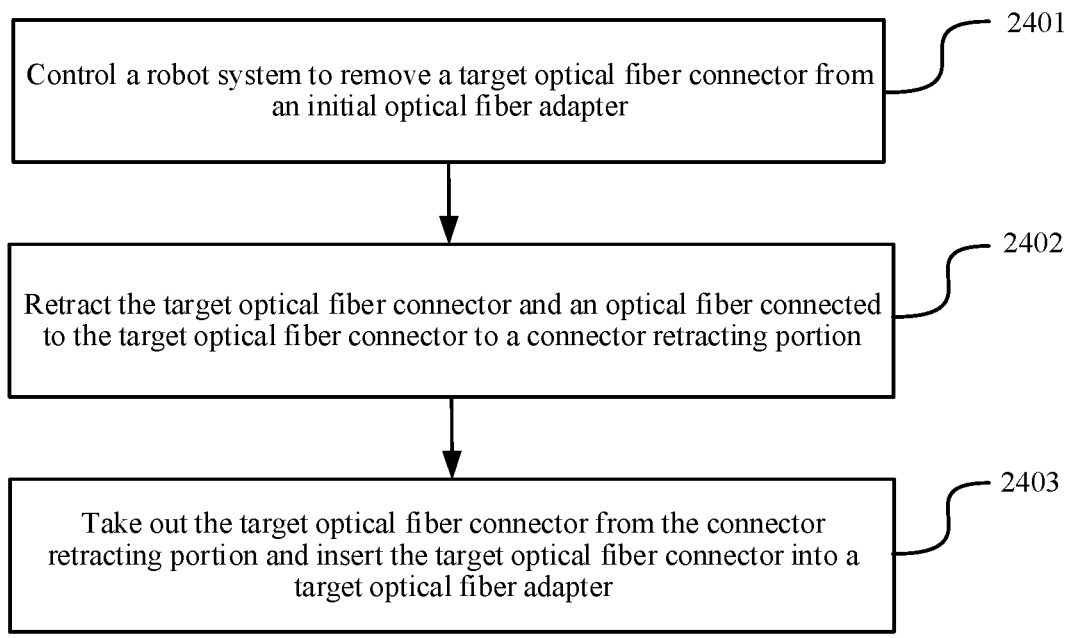
FIG. 24 is a flowchart of an optical fiber scheduling method according to an embodiment of the present disclosure.

An embodiment of the present disclosure further provides an optical fiber scheduling method. As shown in FIG. 24, the method is applied to the optical fiber distribution device, and the method includes the following steps.

Step 2401: Control a robot system 3 to remove a target optical fiber connector from an initial optical fiber adapter.

Step 2402: Retract the target optical fiber connector and an optical fiber connected to the target optical fiber connector to a connector retracting portion 2.

Step 2403: Remove the target optical fiber connector from the connector retracting portion 2, and insert the target optical fiber connector into a target optical fiber adapter.

In a possible implementation, before the controlling a robot system 3 to remove a target optical fiber connector from an initial optical fiber adapter, the method further includes: obtaining a location corresponding to the initial optical fiber adapter; before the retracting the target optical fiber connector and an optical fiber connected to the target optical fiber connector to a connector retracting portion 2, the method further includes: obtaining a location corresponding to a target connector accommodating hole corresponding to the target optical fiber connector; and before the inserting the target optical fiber connector into a target optical fiber adapter, the method further includes: obtaining a location corresponding to the target optical fiber adapter.

In a possible implementation, the method includes: controlling an insertion and removal robot 31 to remove the target optical fiber connector from the initial optical fiber adapter, and release the target optical fiber connector; controlling a first fiber accommodating mechanism 32 to retract the target optical fiber connector and the optical fiber connected to the target optical fiber connector to the connector retracting portion 2; controlling a clamp jaw robot 33 to take out the target optical fiber connector from the connector retracting portion 2, and transfer the target optical fiber connector to the insertion and removal robot 31; and controlling the insertion and removal robot 31 to receive the target optical fiber connector and insert the target optical fiber connector into the target optical fiber adapter.

In a possible implementation, the transferring the target optical fiber connector to the insertion and removal robot 31 includes: controlling the clamp jaw robot 33 to transfer the target optical fiber connector to a transit robot 34; and controlling the transit robot 34 to transfer the target optical fiber connector to the insertion and removal robot 31.

In a possible implementation, the method further includes: controlling a transit robot synchronous belt assembly 213 to drive the transit robot 34 to move.

In a possible implementation, the method further includes: controlling a clamp jaw robot synchronous belt assembly 215 to move the clamp jaw robot 33.

In a possible implementation, the method further includes: controlling an insertion and removal robot synchronous belt assembly 12 to move the insertion and removal robot 31.

In a possible implementation, the method further includes: controlling a column change robot 35 to transfer the insertion and removal robot 31 from an initial insertion and removal robot track to a target insertion and removal robot track.

In a possible implementation, the controlling a column change robot 35 to transfer the insertion and removal robot 31 from an initial insertion and removal robot track to a target insertion and removal robot track includes: controlling a column change synchronous belt assembly 353 and an insertion and removal robot synchronous belt assembly 12 corresponding to the initial insertion and removal robot track to move the insertion and removal robot 31 to a column change track 352; controlling a lead screw mechanism 13 to move the column change robot 35 to a location corresponding to the target insertion and removal robot track; and controlling the column change synchronous belt assembly 353 and an insertion and removal robot synchronous belt assembly 12 corresponding to the target insertion and removal robot track to move the column change robot 35 to the target insertion and removal robot track.

In a possible implementation, the method includes: controlling a distribution robot 36 to remove the target optical fiber connector from the initial optical fiber adapter, and release the target optical fiber connector; controlling a second fiber accommodating mechanism 37 to retract the target optical fiber connector and the optical fiber connected to the target optical fiber connector to the connector retracting portion 2; and controlling the distribution robot 36 to take out the target optical fiber connector from the connector retracting portion 2, and insert the target optical fiber connector into the target optical fiber adapter.

An embodiment of the present disclosure further provides an optical fiber scheduling system. The system includes a controller and an optical fiber distribution device. The controller is configured to perform the optical fiber scheduling method according to any one of the foregoing.

The controller may be included in the optical fiber distribution device, or may be located outside the optical fiber distribution device. This is not specifically limited in this embodiment of the present disclosure.

An embodiment of the present disclosure further provides a computer-readable storage medium, including instructions. When the computer-readable storage medium runs on an optical fiber distribution device, the optical fiber distribution device is enabled to perform the optical fiber scheduling method according to any one of the foregoing.

An embodiment of the present disclosure further provides a computer program product including instructions. When the computer program product runs on an optical fiber distribution device, the optical fiber distribution device performs the optical fiber scheduling method according to any one of the foregoing.

An embodiment of the present disclosure further provides a chip, including a programmable logic circuit and/or program instructions. When the chip runs, the chip is configured to implement the optical fiber scheduling method according to any one of the foregoing.

The foregoing descriptions are only optional embodiments of the present disclosure, but are not intended to limit the present disclosure. Any modification, equivalent replacement, or improvement made within the principle of the present disclosure should fall within the protection scope of the present disclosure.

What is claimed is:

1. An optical fiber distribution device comprising:
   a distribution portion comprising an optical fiber adapter, wherein the optical fiber adapter is configured to connect to a first optical fiber connector connected to a first optical fiber;
   a connector retracting portion configured to accommodate the first optical fiber connector and the first optical fiber; and
   a robot system comprising:
      an insertion and removal robot located on the distribution portion, wherein the insertion and removal robot is configured to insert the first optical fiber connector into the optical fiber adapter and remove the first optical fiber connector from the optical fiber adapter;
      a first fiber accommodating mechanism located on the connector retracting portion, wherein the first fiber accommodating mechanism is configured to retract the first optical fiber connector and the first optical fiber connected to the first optical fiber connector to the connector retracting portion; and
      a clamp jaw robot located on the connector retracting portion, wherein the clamp jaw robot is configured to remove the first optical fiber connector from the connector retracting portion and transfer the first optical fiber connector to the insertion and removal robot; and
   wherein the robot system is configured to:
      remove a target optical fiber connector from an initial optical fiber adapter,
      retract the target optical fiber connector and a second optical fiber connected to the target optical fiber connector to the connector retracting portion,
      remove the target optical fiber connector from the connector retracting portion, and
      insert the target optical fiber connector into a target optical fiber adapter.

2. The optical fiber distribution device of claim 1, wherein the connector retracting portion comprises a plurality of connector accommodating holes corresponding one-to-one to a plurality of optical fiber connectors, wherein the target optical fiber connector corresponds to a target connector accommodating hole, wherein the second optical fiber connected to the target optical fiber connector passes through the target connector accommodating hole, wherein when the target optical fiber connector and the second optical fiber connected to the target optical fiber connector are retracted to the connector retracting portion, the robot system is configured to retract a target optical fiber passing through the target connector accommodating hole to the connector retracting portion and retract a second optical fiber connector to which the target optical fiber is connected to the target connector accommodating hole, and wherein when the target optical fiber connector is removed from the connector retracting portion, the robot system is configured to remove the second optical fiber connector from the target connector accommodating hole.

3. The optical fiber distribution device of claim 1, wherein the connector retracting portion comprises a connector parking area, an active fiber accommodating area, and a fiber storage area sequentially arranged in a direction of the first optical fiber, wherein the connector parking area is close to the first optical fiber connector, wherein the clamp jaw robot is located in the connector parking area, and wherein the first fiber accommodating mechanism is located in the active fiber accommodating area.

4. The optical fiber distribution device of claim 3, wherein the robot system further comprises a transit robot located in a junctional area between the distribution portion and the connector parking area, and wherein the transit robot is configured to transfer the first optical fiber connector carried by the clamp jaw robot to the insertion and removal robot.

5. The optical fiber distribution device of claim 1, wherein the first fiber accommodating mechanism comprises two fiber accommodating units; arranged opposite to each other, wherein the fiber accommodating units each comprise:
    a rotating shaft, wherein an axis direction of the rotating shaft is parallel to an arrangement direction of connector accommodating holes; and
    a fiber accommodating wheel, wherein the fiber accommodating wheel is connected to the rotating shaft and is movable in an axial direction of the rotating shaft; wherein the fiber accommodating wheel is provided with protrusion portions in a circumferential direction, wherein first locations of the protrusion portions of the fiber accommodating wheel of a first fiber accommodating unit correspond to second locations of the protrusion portions of the fiber accommodating wheel of a second fiber accommodating unit, and wherein in a fiber accommodating state of the first fiber accommodating mechanism, the protrusion portions clamp the first optical fiber connected to the first optical fiber connector; and accommodate, through rotation, the first optical fiber.

6. The optical fiber distribution device of claim 4, wherein the transit robot comprises:
    a transit robot base;
    an overturning plate, wherein a surface of the overturning plate close to the connector retracting portion is provided with a connector carrying hole, and wherein the connector carrying hole is fitted with the first optical fiber connector; and
    an overturning driving apparatus fixed on the transit robot base, wherein the overturning driving apparatus is in transmission connection to the overturning plate.

7. The optical fiber distribution device of claim 6, wherein the connector parking area comprises a transit robot track and a transit robot synchronous belt assembly, wherein an axis direction of the transit robot track is perpendicular to an arrangement direction of connector accommodating holes, wherein the transit robot track is located on one side of the connector parking area, wherein the transit robot synchronous belt assembly is located inside the transit robot track, and wherein the transit robot base matches the transit robot track and is fixedly connected to the transit robot synchronous belt assembly.

8. The optical fiber distribution device of claim 1, wherein the clamp jaw robot comprises:
    a transverse movable base slidably connected to a clamp jaw robot base, wherein a sliding direction of the transverse movable base is perpendicular to an arrangement direction of connector accommodating holes;
    a clamp jaw rotation driving apparatus fixed on the transverse movable base;
    a clamp jaw pair sleeved on a rotating shaft of the clamp jaw rotation driving apparatus; and
    a clamping mechanism located on the transverse movable base and configured to tighten or loosen the clamp jaw pair.

9. The optical fiber distribution device of claim 8, wherein the clamping mechanism comprises:
    two clamping arms, wherein middle parts of the two clamping arms are hinged and a hinged point is fixed, wherein the two clamping arms are provided with connection protrusions, and wherein each clamping end of the two clamping arms clamps one clamp jaw of the clamp jaw pair;
    a driving connecting rod, wherein two ends of the driving connecting rod are provided with connection holes, wherein the connection protrusions of the clamping arms are respectively located in the connection holes, and wherein the connection protrusions are slidable in the connection holes; and
    a clamping driving apparatus comprising a push rod fixedly connected to the driving connecting rod, wherein the push rod is perpendicular to the driving connecting rod.

10. The optical fiber distribution device of claim 8, wherein a connector parking area is provided with a clamp jaw robot guide rail and a clamp jaw robot synchronous belt assembly, wherein an axis direction of the clamp jaw robot guide rail and a movement direction of the clamp jaw robot synchronous belt assembly are parallel to an arrangement direction of the connector accommodating holes, and wherein the clamp jaw robot base of the clamp jaw robot matches the clamp jaw robot guide rail, and is fixedly connected to the clamp jaw robot synchronous belt assembly.

11. The optical fiber distribution device of claim 10, wherein the insertion and removal robot comprises:
    an insertion and removal robot base;
    an insertion and removal base slidably connected to the insertion and removal robot base in a first direction perpendicular to the distribution portion;
    two clamping bases located on the insertion and removal base, wherein the two clamping bases are slidably connected to the insertion and removal base in a second direction parallel to an axis direction of the clamp jaw robot guide rail, and wherein movement directions of the two clamping bases are opposite; and
    two clamping arms respectively located on the two clamping bases, wherein the two clamping arms are slidably connected to the clamping bases in a third direction perpendicular to both the first direction and the second direction.

12. The optical fiber distribution device of claim 2, wherein the distribution portion comprises:
- an insertion and removal robot track located on one side of at least one column of optical fiber adapters; and
- an insertion and removal robot synchronous belt assembly located inside the insertion and removal robot track, and wherein the insertion and removal robot matches the insertion and removal robot track and is engaged with the insertion and removal robot synchronous belt assembly.

13. The optical fiber distribution device of claim 12, further comprising a plurality of columns of insertion and removal robot tracks, wherein the robot system further comprises a column change robot located on the distribution portion, and wherein the column change robot is configured to transfer the insertion and removal robot to different insertion and removal robot tracks.

14. The optical fiber distribution device of claim 13, wherein the column change robot comprises:
- a column change robot base;
- a column change track fixed on the column change robot base; and
- a column change synchronous belt assembly located inside the column change track, wherein the distribution portion further comprises a lead screw mechanism, wherein an axis direction of the lead screw mechanism is parallel to an arrangement direction of the plurality of columns of insertion and removal robot tracks, wherein the column change robot base matches the lead screw mechanism, and wherein in a column change state of the insertion and removal robot, the insertion and removal robot matches the column change track and is engaged with the column change synchronous belt assembly.

15. The optical fiber distribution device of claim 1, wherein the robot system comprises:
- a distribution robot located between the distribution portion and the connector retracting portion, wherein the distribution robot is configured to insert and remove the first optical fiber connector into and from the optical fiber adapter, and remove the first optical fiber connector from the connector retracting portion; and
- a second fiber accommodating mechanism located on the connector retracting portion, wherein the second fiber accommodating mechanism is configured to retract the first optical fiber connector and the first optical fiber to the connector retracting portion.

16. An optical fiber scheduling method, implemented by an optical fiber distribution device, the optical fiber scheduling method comprising:
- controlling a robot system to remove a target optical fiber connector from an initial optical fiber adapter;
- retracting the target optical fiber connector and an optical fiber connected to the target optical fiber connector to a connector retracting portion;
- removing the target optical fiber connector from the connector retracting portion;
- inserting the target optical fiber connector into a target optical fiber adapter;
- controlling an insertion and removal robot of the robot system to remove the target optical fiber connector from the initial optical fiber adapter and release the target optical fiber connector;
- controlling a first fiber accommodating mechanism of the robot system to retract the target optical fiber connector and the optical fiber to the connector retracting portion;
- controlling a clamp jaw robot of the robot system to remove the target optical fiber connector from the connector retracting portion and transfer the target optical fiber connector to the insertion and removal robot; and
- controlling the insertion and removal robot to receive the target optical fiber connector and insert the target optical fiber connector into the target optical fiber adapter.

17. The optical fiber scheduling method of claim 16, further comprising:
- obtaining a first location corresponding to the initial optical fiber adapter prior to controlling the robot system;
- obtaining a second location corresponding to a target connector accommodating hole corresponding to the target optical fiber connector prior to retracting the target optical fiber connector and the optical fiber to the connector retracting portion; and
- obtaining a third location corresponding to the target optical fiber adapter prior to inserting the target optical fiber connector into the target optical fiber adapter.

18. An optical fiber distribution device comprising:
- a distribution portion comprising an optical fiber adapter, wherein the optical fiber adapter is configured to connect to a first optical fiber connector connected to a first optical fiber;
- a connector retracting portion configured to accommodate the first optical fiber connector and the first optical fiber; and
- a robot system comprising:
  - a distribution robot located between the distribution portion and the connector retracting portion, wherein the distribution robot is configured to insert and remove the first optical fiber connector into and from the optical fiber adapter, and remove the first optical fiber connector from the connector retracting portion; and
  - a second fiber accommodating mechanism located on the connector retracting portion, wherein the second fiber accommodating mechanism is configured to retract the first optical fiber connector and the first optical fiber to the connector retracting portion; and
  - wherein the robot system is configured to:
    - remove a target optical fiber connector from an initial optical fiber adapter,
    - retract the target optical fiber connector and a second optical fiber connected to the target optical fiber connector to the connector retracting portion,
    - remove the target optical fiber connector from the connector retracting portion, and
    - insert the target optical fiber connector into a target optical fiber adapter.

19. The optical fiber distribution device of claim 18, wherein the connector retracting portion comprises a plurality of connector accommodating holes corresponding one-to-one to a plurality of optical fiber connectors, wherein the target optical fiber connector corresponds to a target connector accommodating hole, wherein the second optical fiber connected to the target optical fiber connector passes through the target connector accommodating hole, wherein when the target optical fiber connector and the second optical fiber connected to the target optical fiber connector are retracted to the connector retracting portion, the robot system is configured to retract a target optical fiber passing through the target connector accommodating hole to the connector retracting portion and retract a second optical fiber connector to which the target optical fiber is connected to the target connector accommodating hole, and wherein when the target optical fiber connector is removed from the connector retracting portion, the robot system is configured to remove the second optical fiber connector from the target connector accommodating hole.

20. The optical fiber distribution device of claim 18, wherein the connector retracting portion comprises a connector parking area, an active fiber accommodating area, and a fiber storage area sequentially arranged in a direction of the first optical fiber, wherein the connector parking area is close to the first optical fiber connector, and wherein the second fiber accommodating mechanism is located in the active fiber accommodating area.

* * * * *